United States Patent
Poon et al.

(10) Patent No.: US 10,789,632 B2
(45) Date of Patent: Sep. 29, 2020

(54) SYSTEMS AND METHODS TO FACILITATE TRANSACTIONS

(71) Applicant: eBay Inc., San Jose, CA (US)

(72) Inventors: Alex Dai-Shun Poon, Los Altos Hills, CA (US); Scott Leahy, San Jose, CA (US); Michael K. Wilson, San Jose, CA (US)

(73) Assignee: eBay Inc., San Jose, CA (US)

( * ) Notice: Subject to any disclaimer, the term of this patent is extended or adjusted under 35 U.S.C. 154(b) by 320 days.

(21) Appl. No.: 15/257,467

(22) Filed: Sep. 6, 2016

(65) Prior Publication Data
US 2016/0371758 A1   Dec. 22, 2016

Related U.S. Application Data

(63) Continuation of application No. 14/187,936, filed on Feb. 24, 2014, now abandoned, which is a
(Continued)

(51) Int. Cl.
*G06Q 30/06* (2012.01)
*G06F 16/9535* (2019.01)
*G06Q 30/08* (2012.01)

(52) U.S. Cl.
CPC ..... *G06Q 30/0619* (2013.01); *G06F 16/9535* (2019.01); *G06Q 30/0613* (2013.01);
(Continued)

(58) Field of Classification Search
CPC .... G06Q 30/06; G06Q 30/08; G06Q 30/0269; G06Q 30/0601; G06Q 30/0275; H04L 67/02; H04L 67/20; H04L 63/0823
See application file for complete search history.

(56) References Cited

U.S. PATENT DOCUMENTS

| | | |
|---|---|---|
| 4,864,516 A | 9/1989 | Gaither et al. |
| 5,205,200 A | 4/1993 | Wright |
| | (Continued) | |

FOREIGN PATENT DOCUMENTS

| | | |
|---|---|---|
| CN | 103593798 A | 2/2014 |
| JP | 20001331689 A | 11/2001 |
| | (Continued) | |

OTHER PUBLICATIONS

Anonymous, ebay Inc. and MicroSoft Announce SOAP-based XML Web Services for Online E-Commerce, Mar. 15, 2001, pp. 1-3. (Year: 2001).*

(Continued)

*Primary Examiner* — Mohammad Z Shaikh
(74) *Attorney, Agent, or Firm* — Schwegman Lundberg & Woessner, P.A.

(57) ABSTRACT

Systems and methods to facilitate programmatic access to a network-based commerce facility via a network are described. A request is received from a third-party application via a programmatic access application, the request identifying a call function that performs, at least in part, an indirect transaction between a network-based commerce facility and a user via a third-party application. Each call function specifies an allowable amount of information to be transferred from the network-based commerce facility. An action corresponding to the call function is performed in response to the request.

20 Claims, 12 Drawing Sheets

Related U.S. Application Data continuation of application No. 13/914,079, filed on Jun. 10, 2013, now Pat. No. 8,688,527, which is a continuation of application No. 13/619,911, filed on Sep. 14, 2012, now Pat. No. 8,463,653, which is a continuation of application No. 09/999,618, filed on Oct. 31, 2001, now Pat. No. 8,332,275.

(52) U.S. Cl.
CPC ..... *G06Q 30/0625* (2013.01); *G06Q 30/0641* (2013.01); *G06Q 30/08* (2013.01)

(56) References Cited

U.S. PATENT DOCUMENTS

| | | | |
|---|---|---|---|
| 5,485,510 A | 1/1996 | Colbert | |
| 5,557,728 A | 9/1996 | Garrett et al. | |
| 5,598,557 A | 1/1997 | Doner et al. | |
| 5,657,389 A | 8/1997 | Houvener | |
| 5,689,565 A * | 11/1997 | Spies | G06F 21/602 |
| | | | 380/277 |
| 5,694,546 A | 12/1997 | Reisman | |
| 5,706,457 A | 1/1998 | Dwyer et al. | |
| 5,710,887 A | 1/1998 | Chelliah et al. | |
| 5,715,314 A | 2/1998 | Payne et al. | |
| 5,771,291 A | 6/1998 | Newton et al. | |
| 5,771,380 A | 6/1998 | Tanaka et al. | |
| 5,790,790 A | 8/1998 | Smith et al. | |
| 5,799,285 A | 8/1998 | Klingman | |
| 5,803,500 A | 9/1998 | Mossberg | |
| 5,845,265 A | 12/1998 | Woolston | |
| 5,872,848 A | 2/1999 | Romney et al. | |
| 5,873,069 A | 2/1999 | Reuhl et al. | |
| 5,884,056 A | 3/1999 | Steele | |
| 5,890,138 A | 3/1999 | Godin et al. | |
| 5,892,905 A * | 4/1999 | Brandt | H04L 63/02 |
| | | | 726/11 |
| 5,905,974 A | 5/1999 | Fraser et al. | |
| 5,905,975 A | 5/1999 | Ausubel | |
| 5,922,074 A * | 7/1999 | Richard | G06F 21/6218 |
| | | | 726/21 |
| 5,926,794 A | 7/1999 | Fethe | |
| 5,963,915 A | 10/1999 | Kirsch | |
| 5,991,739 A | 11/1999 | Cupps et al. | |
| 6,021,438 A * | 2/2000 | Duvvoori | G06F 21/105 |
| | | | 709/224 |
| 6,035,288 A | 3/2000 | Solomon | |
| 6,035,402 A * | 3/2000 | Vaeth | H04L 9/321 |
| | | | 713/158 |
| 6,044,363 A | 3/2000 | Mori et al. | |
| 6,047,264 A | 4/2000 | Fisher et al. | |
| 6,055,518 A | 4/2000 | Franklin et al. | |
| 6,058,417 A | 5/2000 | Hess et al. | |
| 6,061,057 A | 5/2000 | Knowlton et al. | |
| 6,061,448 A | 5/2000 | Smith et al. | |
| 6,073,117 A | 6/2000 | Oyanagi et al. | |
| 6,085,176 A | 7/2000 | Woolston | |
| 6,092,053 A | 7/2000 | Boesch et al. | |
| 6,104,815 A | 8/2000 | Alcorn et al. | |
| 6,119,137 A | 9/2000 | Smith et al. | |
| 6,125,391 A * | 9/2000 | Meltzer | G06Q 99/00 |
| | | | 709/223 |
| 6,178,408 B1 | 1/2001 | Copple et al. | |
| 6,192,407 B1 | 2/2001 | Smith et al. | |
| 6,202,051 B1 | 3/2001 | Woolston | |
| 6,233,545 B1 | 5/2001 | Datig | |
| 6,243,691 B1 | 6/2001 | Fisher et al. | |
| 6,334,101 B1 | 12/2001 | Hetherington et al. | |
| 6,338,138 B1 * | 1/2002 | Raduchel | G06F 21/6218 |
| | | | 713/155 |
| 6,345,243 B1 | 2/2002 | Clark | |
| 6,385,586 B1 | 5/2002 | Dietz | |
| 6,453,353 B1 * | 9/2002 | Win | G06F 21/604 |
| | | | 709/225 |
| 6,598,027 B1 | 7/2003 | Breen, Jr. et al. | |
| 6,604,107 B1 | 8/2003 | Wang | |
| 6,633,848 B1 | 10/2003 | Johnson et al. | |
| 6,714,544 B1 | 3/2004 | Bosloy et al. | |
| 6,856,967 B1 * | 2/2005 | Woolston | G06Q 30/06 |
| | | | 705/26.3 |
| 6,892,186 B1 * | 5/2005 | Preist | G06Q 30/08 |
| | | | 705/26.3 |
| 7,013,289 B2 | 3/2006 | Horn et al. | |
| 7,143,437 B2 * | 11/2006 | Royer | G06F 21/41 |
| | | | 726/8 |
| 7,184,988 B1 * | 2/2007 | Frankel | G06Q 20/00 |
| | | | 370/235 |
| 7,289,967 B1 | 10/2007 | Brader-Araje et al. | |
| 7,383,556 B1 * | 6/2008 | Pantuso | H04L 63/102 |
| | | | 719/328 |
| 7,606,901 B2 * | 10/2009 | Heymann | H04L 29/06 |
| | | | 709/225 |
| 7,610,218 B2 | 10/2009 | Bodmer et al. | |
| 7,640,190 B1 | 12/2009 | Sullivan et al. | |
| 7,953,638 B2 | 5/2011 | Hofer et al. | |
| 8,332,275 B2 * | 12/2012 | Poon | G06Q 30/0613 |
| | | | 705/26.1 |
| 8,463,653 B2 * | 6/2013 | Poon | G06Q 30/0613 |
| | | | 705/26.1 |
| 8,682,732 B2 | 3/2014 | Poon et al. | |
| 8,688,527 B2 | 4/2014 | Poon et al. | |
| 2001/0007981 A1 * | 7/2001 | Woolston | G06Q 20/12 |
| | | | 705/26.41 |
| 2001/0025258 A1 | 9/2001 | Foia et al. | |
| 2001/0047321 A1 * | 11/2001 | Wyatt | G06Q 30/08 |
| | | | 705/37 |
| 2001/0049652 A1 * | 12/2001 | Nakajima | G06Q 30/08 |
| | | | 705/37 |
| 2002/0010867 A1 * | 1/2002 | Schaefer | G06F 21/6236 |
| | | | 726/29 |
| 2002/0023654 A1 | 2/2002 | Webb | |
| 2002/0030696 A1 | 3/2002 | Twinkwalder et al. | |
| 2002/0032641 A1 * | 3/2002 | Mendiola | G06Q 30/0267 |
| | | | 705/37 |
| 2002/0035450 A1 | 3/2002 | Thackston | |
| 2002/0038282 A1 * | 3/2002 | Montgomery | G06Q 30/08 |
| | | | 705/37 |
| 2002/0035534 A1 | 4/2002 | Buist et al. | |
| 2002/0039952 A1 | 4/2002 | Clem | |
| 2002/0077805 A1 | 6/2002 | Hecht et al. | |
| 2002/0082974 A1 | 6/2002 | Berstis | |
| 2002/0087301 A1 | 7/2002 | Jones et al. | |
| 2002/0095377 A1 | 7/2002 | Likourezos et al. | |
| 2002/0099735 A1 * | 7/2002 | Schroeder | G06Q 30/06 |
| | | | 715/239 |
| 2002/0103698 A1 * | 8/2002 | Cantrell | G06Q 30/02 |
| | | | 705/14.55 |
| 2002/0103789 A1 * | 8/2002 | Turnbull | G06F 17/30867 |
| 2002/0173295 A1 * | 11/2002 | Nykanen | H04M 1/72561 |
| | | | 455/414.1 |
| 2003/0005159 A1 | 1/2003 | Kumhyr | |
| 2003/0115121 A1 | 6/2003 | Bremner et al. | |
| 2003/0115572 A1 | 6/2003 | Zondervan et al. | |
| 2004/0103040 A1 | 5/2004 | Ronaghi et al. | |
| 2004/0133478 A1 * | 7/2004 | Leahy | G06O 30/06 |
| | | | 709/225 |
| 2005/0022115 A1 * | 1/2005 | Baumgartner | G06F 17/30867 |
| | | | 715/205 |
| 2005/0043941 A1 | 2/2005 | Janakiraman et al. | |
| 2005/0075942 A1 | 4/2005 | Hofer et al. | |
| 2006/0271695 A1 | 11/2006 | Lavian | |
| 2011/0197208 A1 | 8/2011 | Hofer et al. | |
| 2013/0073415 A1 | 3/2013 | Poon et al. | |
| 2013/0268386 A1 | 10/2013 | Poon et al. | |
| 2013/0268387 A1 | 10/2013 | Poon et al. | |
| 2014/0172639 A1 | 6/2014 | Poon et al. | |

FOREIGN PATENT DOCUMENTS

| | | |
|---|---|---|
| WO | WO-9963461 A1 | 12/1999 |
| WO | 2001/043033 A1 | 6/2001 |

(56) References Cited

FOREIGN PATENT DOCUMENTS

| WO | 2002/001387 A2 | 1/2002 |
|---|---|---|
| WO | 2002/001400 A1 | 1/2002 |
| WO | 2002/033618 A1 | 4/2002 |
| WO | 2002/088977 A1 | 11/2002 |
| WO | 2003/040951 A1 | 5/2003 |
| WO | WO-03038723 | 5/2003 |
| WO | 2005/045722 A1 | 5/2005 |

OTHER PUBLICATIONS

Schaek, Thomas, Abstract: "WebSphere Portal Server and Web Services Whitepaper", IBM Software Group, Jun. 6, 2001, p. 1 (Year: 2001).*
Schaek, Thomas, "Web Sphere Portal Server and Web Services Whitepaper", IBM Software Group, Jun. 6, 2001, pp. 1-23, (Year: 2001).*
Anonymous, Ebay Inc, and Microsoft Announce SOAP_XML Web Services for Online E-commerce, Mar. 15, 2001, pp. 1-3, (Year: 2001).*
"U.S. Appl. No. 14/187,936, Examiner Interview Summary dated Jan. 31, 2017", 2 pgs.
"Chinese Application Serial No. 201310451619.X, Office Action dated Nov. 30, 2016", with English translation of claims, 7 pgs.
"Chinese Application Serial No. 201310451619.X, Response filed Feb. 15, 2017", with English translation of claims, 7 pgs.
"U.S. Appl. No. 09/999,618, Advisory Action dated Aug. 18, 2010", 3 pgs.
"U.S. Appl. No. 09/999,618, Advisory Action dated Nov. 15, 2006", 3 pgs.
"U.S. Appl. No. 09/999,618, Appeal Brief filed Oct. 22, 2007", 26 pgs.
"U.S. Appl. No. 09/999,618, Decision on Pre-Appeal Brief Request mailed Sep. 21, 2007", 2 pgs.
"U.S. Appl. No. 09/999,618, Examiner Interview Summary dated Sep. 15, 2010", 4 pgs.
"U.S. Appl. No. 09/999,618, Examiner's Answer to Appeal Brief mailed Jan. 17, 2008", 17 pgs.
"U.S. Appl. No. 09/999,618, Final Office Action dated Jun. 14, 2007", 12 pgs.
"U.S. Appl. No. 09/999,618, Final Office Action dated Jun. 16, 2011", 24 pgs.
"U.S. Appl. No. 09/999,618, Final Office Action dated Jul. 6, 2005", 9 pgs.
"U.S. Appl. No. 09/999,618, Final Office Action dated Jul. 9, 2010", 16 pgs.
"U.S. Appl. No. 09/999,618, Final Office Action dated Aug. 1, 2006", 10 pgs.
"U.S. Appl. No. 09/999,618, Non Final Office Action dated Jan. 6, 2011", 20 pgs.
"U.S. Appl. No. 09/999,618, Non Final Office Action dated Feb. 17, 2006", 8 pgs.
"U.S. Appl. No. 09/999,618, Non Final Office Action dated Mar. 8, 2007", 10 pgs.
"U.S. Appl. No. 09/999,618, Non Final Office Action dated Dec. 9, 2011", 25 pgs.
"U.S. Appl. No. 09/999,618, Non Final Office Action dated Dec. 20, 2004", 8 pgs.
"U.S. Appl. No. 09/999,618, Non-Final Office Action dated Dec. 28, 2009", 15 pgs.
"U.S. Appl. No. 09/999,618, Notice of Allowance dated Jul. 30, 2012", 12 pgs.
"U.S. Appl. No. 09/999,618, Pre-Appeal Brief Request filed Jul. 27, 2007", 5 pgs.
"U.S. Appl. No. 09/999,618, PTO Response to 312 Amendment dated Nov. 9, 2012", 2 pgs.
"U.S. Appl. No. 09/999,618, Reply Brief filed Jan. 24, 2008", 7 pgs.
"U.S. Appl. No. 09/999,618, Response filed Mar. 1, 2005 to Non Final Office Action dated Dec. 20, 2004", 18 pgs.
"U.S. Appl. No. 09/999,618, Response filed Apr. 6, 2011 to Non Final Office Action dated Jan. 6, 2011", 15 pgs.
"U.S. Appl. No. 09/999,618, Response filed Apr. 13, 2007 to Non Final Office Action dated Mar. 8, 2007", 15 pgs.
"U.S. Appl. No. 09/999,618, Response filed Apr. 23, 2010 to Non Final Office Action dated Dec. 28, 2009", 15 pgs.
"U.S. Appl. No. 09/999,618, Response filed May 17, 2006 to Non Final Office Action dated Feb. 17, 2006", 14 pgs.
"U.S. Appl. No. 09/999,618, Response filed Jun. 8, 2012 to Non Final Office Action dated Dec. 9, 2011", 21 pgs.
"U.S. Appl. No. 09/999,618, Response filed Aug. 11, 2010 to Final Office Action dated Jun. 9, 2010", 14 pgs.
"U.S. Appl. No. 09/999,618, Response filed Oct. 30, 2012 to Notice of Allowance dated Jul. 30, 2012", 13 pgs.
"U.S. Appl. No. 09/999,618, Response filed Nov. 1, 2006 to Final Office Action dated Aug. 1, 2006", 15 pgs.
"U.S. Appl. No. 09/999,618, Response filed Nov. 16, 2011 to Final Office Action dated Jun. 16, 2011", 15 pgs.
"U.S. Appl. No. 09/999,618, Response filed Dec. 6, 2005 to Final Office Action dated Jul. 6, 2005", 14 pgs.
"U.S. Appl. No. 13/619,911, Examiner Interview Summary dated Mar. 15, 2013", 3 pgs.
"U.S. Appl. No. 13/619,911, Examiner Interview Summary dated Apr. 12, 2013", 3 pgs.
"U.S. Appl. No. 13/619,911, Notice of Allowance dated Feb. 6, 2013", 11 pgs.
"U.S. Appl. No. 13/911,655, Notice of Allowance dated Nov. 1, 2013", 14 pgs.
"U.S. Appl. No. 13/911,655, Preliminary Amendment filed Sep. 26, 2013", 12 pgs.
"U.S. Appl. No. 13/914,079, Notice of Allowance dated Nov. 4, 2013", 15 pgs.
"U.S. Appl. No. 13/914,079, Preliminary Amendment Filed Sep. 19, 2013", 9 pgs.
"U.S. Appl. No. 14/187,936, Appeal Brife filed Dec. 28, 2015", (Dec. 28, 2015), 33 pgs.
"U.S. Appl. No. 14/187,936, Examiner Interview Summary dated May 1, 2015", 3 pgs.
"U.S. Appl. No. 14/187,936, Examiner's Answer filed Jul. 6, 2016 to Appeal Brief filed Dec. 28, 2015", 11 pgs.
"U.S. Appl. No. 14/187,936, Final Office Action dated Jun. 25, 2015", 21 pgs.
"U.S. Appl. No. 14/187,936, Non Final Office Action dated Mar. 23, 2015", 15 pgs.
"U.S. Appl. No. 14/187,936, Preliminary Amendment filed Mar. 13, 2014", 10 pgs.
"U.S. Appl. No. 14/187,936, Response filed May 26, 2015 to Non Final Office Action dated Mar. 23, 2015", 27 pgs.
"Australian Application Serial No. 2002240354, Examiner Report dated Feb. 22, 2008", 1 pgs.
"Australian Application Serial No. 2002240354, Notice of Acceptance dated Oct. 8, 2008", 3 pgs.
"Australian Application Serial No. 2002240354, Response to Examiner Search Report dated Feb. 11, 2008", 1 pgs.
"Canadian Application Serial No. 2,465,935 Response Filed Nov. 13, 2014 to Non-Final Office Action dated May 15, 2014", 10 pgs.
"Canadian Application Serial No. 2,465,935, Office Action dated Jan. 13, 2012", 4 pgs.
"Canadian Application Serial No. 2,465,935, Office Action dated Feb. 11, 2013", 2 pgs.
"Canadian Application Serial No. 2,465,935, Office Action dated May 15, 2014", 5 pgs.
"Canadian Application Serial No. 2,465,935, Response filed Aug. 15, 2013", 10 pgs.
"Canadian Application Serial No. 2,465,935, Response filed Jul. 13, 2012 to Office Action dated Jan. 13, 2012", 23 pgs.
"Canadian Application Serial No. 2,465,935, Voluntary Amendment filed Feb. 19, 2007", 9 pgs.
"Chinese Application Serial No. 02821874.4, Chinese Office Action dated Dec. 6, 2010", in English, 9 pgs.
"Chinese Application Serial No. 02821874.4, Office Action dated Jun. 5, 2009", 3 pgs.

(56) References Cited

OTHER PUBLICATIONS

"Chinese Application Serial No. 02821874.4, Office Action dated Jun. 27, 2013", with English translation of claims, 26 pgs.
"Chinese Application Serial No. 02821874.4, Office Action dated Nov. 1, 2010", 7 pgs.
"Chinese Application Serial No. 02821874,4, Office Action dated Nov. 21, 2008", in English, 5 pgs.
"Chinese Application Serial No. 02821874.4, Request for Reexamination dated Feb. 16, 2011", 20 pgs.
"Chinese Application Serial No. 02821874.4, Response filed Apr. 7, 2009 to First Office Action dated Nov. 21, 2008", with English translation of claims, 18 pgs.
"Chinese Application Serial No. 02821874.4, Response filed Oct. 19, 2009 to Second Office Action dated Jun. 5, 2009", with English translation of claims, 13 pgs.
"Chinese Application Serial No. 02821874.4, Response filed Jun. 21, 2012 to Notice of Reexamination dated Mar. 6, 2012", with English translation of claims, 21 pgs.
"Chinese Application Serial No. 02821874.4, Voluntary Amendment filed May 25, 2005", with English version of form for correction, 9 pgs.
"Chinese Application Serial No. 201310451619.X, Office Action dated Mar. 28, 2016", with English translation of Claims, 21 pgs.
"Chinese Application Serial No. 201310451619.X, Response filed Aug. 12, 2016 to Office Action dated Mar. 28, 2016", English Translation of Claims, 15 pgs.
"Chinese Application Serial No. 02821874.4, Notice of Reexamination dated Mar. 6, 2012", with English translation of claims, 12 pgs.
"EBay Inc. and Microsoft Announce SOAP-Based XML Web Services for Online E-Commerce", [Online]. Retrieved from the Internet: <URL: http://xml.coverpages.org/ni2001-03-15-d.html>, (Mar. 15, 2001), 1-2.
"EBay Inc. and Microsoft Announces SOAP-based XML Web Services for online E-Commerce", http://xml.coverpages.org/ni2001-03-15-d.html, (2001).
"European Application Serial No. 02706252.0, Decision to Refuse dated Jul. 1, 2011", 17 pgs.
"European Application Serial No. 02706252.0, European Office Action dated Aug. 3, 2005", 1 pgs.
"European Application Serial No. 02706252.0, European Office Action dated Feb. 28, 2006", 6 pgs.
"European Application Serial No. 02706252.0, Response to Office Action dated Feb. 28, 2006", 58 pgs.
"European Application Serial No. 02706252.0, Response to Office Action dated Aug. 3, 2005", 1 pgs.
"European Application Serial No. 02706252.0, Summons to Attend Oral Proceedings mailed Feb. 1, 2011", 11 pgs.
"European Application Serial No. 02706252.0, Supplemental Search Report dated Jul. 29, 2005", 6 pgs.
"International Application Serial No. PCT/US02/04148, International Preliminary Examination Report dated May 7, 2004", 4 pgs.
"International Search Report for PCT/US/01/12398", Applicant eBay, Inc., (dated Aug. 27, 2001), 1 pg.
"Korean Application Serial No. 10-2004-7006590, Non Final Office Action dated Sep. 3, 2007", 7 pgs.
"Korean Application Serial No. 10-2004-7006590, Response to Non Final Office Action dated Sep. 3, 2007", 58 pgs.
"Korean Application Serial No. 2004-7006590, Notice of Allowance dated Jan. 9, 2008", 3 pgs.
Allen, Charles, "WIDL—Application Integration with XML", In "XML: Principles, Tools, and Techniques", World-Wide Web Journal, 2(4), (Winter 1997), 229-248.
Bray, Tim, et al., "Extensible Markup Language (XML): Part 1. Syntax", W3C Working Draft Jun. 30, 1997, [Online]. Retrieved from the Internet: <URL: http://web.archive.org/web/19970730053737/http://www.w3.org/TR/WD-xml-lang>, (Jun. 30, 1997), 1-52.
Bray, Tim, et al., "Extensible Markup Language (XML): Part 2. Linking", W3C Working Draft Jul. 31, 1997, [Online]. Retrieved from the Internet: <URL: http://web.archive.org/web/19980213192206/http://www13.w3.org/TR/WD-xml-link>, (Jul. 31, 1997), 1-25.
Brooks, Charles, et al., "Application-Specific Proxy Servers as HTTP Stream Transducers", Also in Proceedings of WWW4. Charles Brooks, Murray S. Mazer, Scott Meeks, and Jim Miller, World Wide Web Journal [Online]. Retrieved from the Internet: <URL: http://www.w3j.com/1/brooks.056/paper/056.html>, (Winter 1996), 1-13.
Business Wire, "Mediappraise Receives National Award for Web-based Technology That Enables Companies to Solve Thorny HR Problem", Business Wire, (Dec. 14, 1998), 1-2.
Fulton, Jim, "The Python Object Publisher, a Gateway Between the World-Wide Web and Python-Based Object Systems", OOPSLA'96 Workshop—Toward the Integration of WWW and Distributed Objects, (1996), 1-5.
Gabriel, Richard P, "The Rise of "Worse Is Better"", Section in Lisp: Good News, Bad News, and How to Win Big., http://www.ai.mit.edu/docs/articles/good-news/good-news.html, (1989), 1-21.
Iyengar, A, "Dynamic argument embedding: preserving state on the World Wide Web", IEEE Internet Computing, 1(2), (Mar.-Apr. 1997), 50-56.
Javaserver Products, "The Servlet API, Sun Microsystems", [Online]. Retrieved from the Internet: <URL: http://web.archive.org/web/19981202010416/jserv.javasoft.com/products/java-server/servlets/index.html>, (1998), 1 page.
Khare, Rohit, et al., "Composing Active Proxies to Extend the Web", Workshop on Compositional Software Architectures, Monterey, California, http://www.objs.com/workshops/ws9801/papers/paper102.html, (Jan. 1998), 1-5.
Kreger, H., "Web Services Conceptual Architecture (WSCA 1.0)", IBM White Paper, (May 2001), 1-41.
Kristensen, Anders, "Developing HTML-Based Web Applications", Proceedings of the First International Workshop on Web Engineering, (Apr. 1998), 17 pgs.
Kristensen, Anders, "Template Resolution in XML/HTML", Proceedings of the Seventh World Wide Web Conference, Brisbane, Australia, (Apr. 1998), 1-16.
Meade, J., "Visual 360: A Performance Appraisal System That's 'Fun'", HR Magazine, Society for Human Resource Management, (Jul. 1999), 3 pgs.
Preist, Chris, et al., "Adaptive Agents in a Persistent Shout Double Auction", International Conference on Information and Computation Economies, Proceedings of the first international conference on Information and computation economies, (1998), 11-18.
Rees, Owen, "A Web of Distributed Objects", Proceedings of World Wide Web 4, Boston, http://www.w3journal.com/1/rtor.085/paper/085.html, (Dec. 1995), 1-18.
Resnick, Paul, "Reputation systems", Communications of the ACM, 43(12), (Dec. 2000), 45-48.
Rice, James, et al., "Using the Web Instead of a Window System", Proceedings of the SIGCHI conference on Human factors in computing systems: common ground, Vancouver, British Columbia, Canada, The Kristensen reference listed the title as "Lesson Learned Using the Web as an Application Interface" at CHI 96 in Vancouver. The attached article has a different title but was the only paper given by these authors at CHI 96., (1996), 103-110.
Schaeck, T., "WebSphere Portal Server and Web Services Whitepaper", IBM White Paper, (2001), 1-23.
Schaeck, T., "WebSphere Portal Server and Web Services Whitepaper", "Internet Archive Wayback Machine, searched for http://xml.coverpages.org/IBM-WPS-20010522", http://xml.coverpages.org/IBM-WPS-20010522.pdf, (2001), 22 pgs.
Stroulia, et al., "Towards the Web-Based Architectural Style", proceeding of the 1st ASERC workshop on software architecture(AWSA 2001: Aug. 24-25, 2001; Edmonton,Canada), (2001), 1-6.
Venu, Vasudevan, "A Web Services Primer", XML.com, (2001), 1-10.
Xerox, "Inter-Language Unification, Xerox PARC", [Online]. Retrieved from the Internet: <URL: http://web.archive.org/web/20020908160140/ftp://ftp.parc.xerox.com/pub/ilu/ilu.html>, (May 30, 2000), 1-5.
Office Action received for European Patent Application No. 03818976.7, dated Jun. 20, 2008, 4 pages.
Summons to Attend Oral Proceedings received for European Patent Application No. 03818976.7, mailed on Apr. 20, 2012, 9 pages.

(56) References Cited

OTHER PUBLICATIONS

Supplementary European Search Report received for European Patent Application No. 03818976.7, dated Dec. 28, 2007, 4 pages.
Advisory Action received for U.S. Appl. No. 10/741,092, dated Apr. 2, 2009, 3 pages.
Appeal Brief filed for U.S. Appl. No. 10/741,092, on Jul. 22, 2010, 28 pages.
Examiner Initiated Interview Summary received for U.S. Appl. No. 10/741,092, dated Jun. 18, 2007, 2 pages.
Final Office Action received for U.S. Appl. No. 10/741,092, dated Feb. 22, 2010, 17 pages.
Final Office Action received for U.S. Appl. No. 10/741,092, dated Jan. 13, 2009, 23 pages.
Final Office Action received for U.S. Appl. No. 10/741,092, dated Mar. 12, 2007, 9 pages.
Non-Final Office Action received for U.S. Appl. No. 10/741,092, dated Aug. 6, 2009, 17 pages.
Non-Final Office Action received for U.S. Appl. No. 10/741,092, dated Feb. 6, 2008, 15 pages.
Non-Final Office Action received for U.S. Appl. No. 10/741,092, dated Sep. 1, 2006, 10 pages.
Notice of Allowance received for U.S. Appl. No. 10/741,092, dated Jan. 28, 2011, 7 pages.
Response to Advisory Action filed on May 13, 2009 for U.S. Appl. No. 10/741,092, dated Apr. 2, 2009, 12 pages.
Response to Final Office Action filed on Aug. 15, 2007 for U.S. Appl. No. 10/741,092, dated Mar. 12, 2007, 13 pages.
Response to Final Office Action filed on Mar. 13, 2009 for U.S. Appl. No. 10/741,092, dated Jan. 13, 2009, 11 pages.
Response to Non-Final Office Action filed on Aug. 6, 2008 for U.S. Appl. No. 10/741,092, dated Feb. 6, 2008, 15 pages.
Response to Non-Final Office Action filed on Dec. 4, 2006 for U.S. Appl. No. 10/741,092, dated Sep. 1, 2006, 13 pages.
Response to Non-Final Office Action filed on Dec. 7, 2009 for U.S. Appl. No. 10/741,092, dated Aug. 6, 2009, 16 pages.
Applicant Initiated Interview Summary received for U.S. Appl. No. 13/088,105, dated Mar. 20, 2015, 3 pages.
Examiner Initiated Interview Summary received for U.S. Appl. No. 13/088,105, dated Dec. 28, 2016, 1 page.
Final Office Action received for U.S. Appl. No. 13/088,105, dated Jun. 12, 2015, 15 pages.
Non-Final Office Action received for U.S. Appl. No. 13/088,105, dated Dec. 27, 2013, 8 pages.
Non-Final Office Action received for U.S. Appl. No. 13/088,105, dated Jan. 5, 2015, 7 pages.
Non-Final Office Action received for U.S. Appl. No. 13/088,105, dated Jun. 17, 2016, 22 pages.
Notice of Allowance received for U.S. Appl. No. 13/088,105, dated Jul. 8, 2014, 8 pages.
Office Action received for Chinese Patent Application No. 200380110502.X, dated Apr. 3, 2009, 11 pages (7 pages English Translation and 4 pages Original Copy).
Office Action received for Chinese Patent Application No. 200380110502.X, dated Feb. 9, 2012, 7 pages (4 pages of English Translation and 3 pages of Official Copy).
Office Action received for Chinese Patent Application No. 200380110502.X, dated Jun. 19, 2012, 12 pages (6 pages of English Translation and 6 pages of Official Copy).
Office Action received for Chinese Patent Application No. 200380110502.X, dated Mar. 2, 2010, 10 pages (6 pages English Translation and 4 pages Original Copy).
Office Action received for Chinese Patent Application No. 200380110502.X, dated Sep. 10, 2010, 5 pages (2 pages English Translation and 3 pages Original Copy).
Response to Office Action filed on Aug. 7, 2009 for Chinese Patent Application No. 200380110502.X, dated Apr. 3, 2009, 8 pages (6 pages of Official Copy and 2 pages of English Claims).
Response to Office Action filed on Dec. 22, 2010 for Chinese Patent Application No. 200380110502.X, dated Sep. 10, 2010, 8 pages (6 pages of Official Copy and 2 pages of English Claims).
Response to Office Action filed on Mar. 24, 2012 for Chinese Patent Application No. 200380110502.X, dated Feb. 9, 2012, 5 pages ( 3 pages of Official Copy and 2 pages of English Claims).
Response to Office Action filed on May 13, 2010 for Chinese Patent Application No. 200380110502.X, dated Mar. 2, 2010, 9 pages (7 pages of Official Copy and 2 pages of English Claims).
Proquest, "eTranslate Secures Additional $18 Million to Expand Its Position as Market Leader and Invest in Latest Globalization Technology", PR Newswire, New York, Dec. 4, 2001, pp. 1-4.
Proquest, "SDL International Begins Trading on the London Stock Exchange", PR Newswire, Dec. 8, 1999, pp. 1-4.
Proquest, "SDL International: Cognitas Chooses SOL's Translation Memory System", M2 Presswire, Sep. 25, 2001, pp. 1-5.
Proquest, "SDL International: Compendium Selects SDL International to Deliver Support for New Multilingual Portal", M2 Presswire, Nov. 14, 2001, pp. 1-3.
Proquest, "Web Crossing, Inc. Announces Team Crossing 2.0; Free Upgrade, Now More Customizable with User and Host Interfaces Completely Localizable", Business Editors, High-Tech Writers. Business Wire, New York., Jun. 5, 2002, pp. 1-4.
Vickers, "Firms Give Global Web Businesses Local Appeal", The Wall Street Journal (Eastern Edition), New York, Dec. 4, 2000, pp. 1-4.
Wikipedia, "Human-Computer Interaction", Retrieved from the Internet : URL<https://en.wikipedia.org/wiki/Human%E2%80%93computer_interaction>, Accessed on Oct. 12, 2017, pp. 1-14.
Wikipedia, "Internationalization and Localization", Retrieved from the Internet : URL <https://en.wikipedia.org/wiki/Internationalization_and_localization>, Accessed on Oct. 12, 2017, pp. 1-7.
Wikipedia, "Unicode", Retrieved from the Internet: URL < https://en.wikipedia.org/wiki/Unicode>, Accessed on Oct. 12, 2017, pp. 1-24.

\* cited by examiner

| LOCATIONS TABLE | | | | | | | | | | | | |
|---|---|---|---|---|---|---|---|---|---|---|---|---|
| ZIP CODE | CITY | STATE | COUNTY NAME | COUNTY CODE | COUNTRY | AREA CODE | TIME ZONE | DAYLIGHT SAVINGS TIME FLAG | LATITUDE | LONGITUDE | CITY FLAG | SOURCE |
| 80 | 82 | 84 | 86 | 88 | 90 | 92 | 94 | 96 | 98 | 100 | 102 | 104 |

*FIG. 5*

| | | |
|---|---|---|
| 902 | AddItem | POST/LIST AN ITEM FOR SALE |
| 904 | VerifyAddItem | VERIFY AN ITEM TO BE POSTED OR LISTED FOR SALE |
| 906 | GetItem | RETRIEVE INFORMATION ON AN ITEM LISTED FOR SALE |
| 908 | RelistItem | RESUBMIT A PREVIOUSLY LISTED ITEM |
| 910 | ReviseItem | CHANGE ATTRIBUTES OF AN ITEM LISTED FOR SALE |
| 912 | GetSellerList | GET ALL ITEMS LISTED FOR SALE BY A SPECIFIED USER |
| 914 | GetBidderList | GET ITEMS BIDDED BY A SPECIFIED USER |
| 916 | GetUser | RETRIEVE INFORMATION FOR A SPECIAL USER |
| 918 | GetFeedback | RETRIEVE FEEDBACK INFORMATION FOR A SPECIFIED USER |
| 920 | LeaveFeedback | LEAVE FEEDBACK FOR A SPECIFIED USER |
| 922 | GetCategories | RETRIEVE SUBCATEGORIES OF A SPECIFIED CATEGORY |
| 924 | GetCategoryListing | RETRIEVE ITEMS LISTED IN A SPECIFIED CATEGORY |
| 926 | GetSearchResults | SEARCH AND RETURN ITEMS LISTED THAT MEET SPECIFIED CRITERIA |
| 928 | GetOfficialTime | GET THE OFFICIAL TIME OF WHEN A FUNCTION ON CALL OCCURS |
| 930 | GetLogoURL | RETRIEVE LOGO FOR THE AUCTION FACILITY |
| 932 | GetTransactionHistory | RETRIEVE A LIST OF ALL TRANSACTIONS ASSOCIATED WITH A FIXED PRICED AUCTION |
| 934 | AddToItemDescription | APPEND TEXT TO A DESCRIPTION OF ITEM LISTED FOR SALE |
| 936 | GetAccount | RETRIEVE A USER'S ACCOUNT INFORMATION INCLUDING PERIOD AND INVOICE |

*FIG. 9*

SYSTEMS AND METHODS TO FACILITATE TRANSACTIONS

CROSS REFERENCE TO RELATED APPLICATIONS

This application is a continuation of U.S. patent application Ser. No. 14/187,936 filed on Feb. 24, 2014, which is a continuation of U.S. patent application Ser. No. 13/914,079, filed on Jun. 10, 2013, which is a continuation of U.S. patent application Ser. No. 13/619,911, filed on Sep. 14, 2012, which is a continuation of U.S. patent application Ser. No. 09/999,618, filed Oct. 31, 2001, all of which are incorporated by reference herein in their entirety.

FIELD OF THE INVENTION

The present invention relates generally to the field of electronic commerce (e-commerce) and, more specifically, to facilitating programmatic access to a network-based commerce facility such as, for example, an Internet-based auction facility.

BACKGROUND OF THE INVENTION

Some of the advantages offered by a typical network-based commerce facility, such as an Internet-based auction facility, are the simplicity, promptness and convenience of participating in the online trading process. Conducting transaction such as an auction over a network-based commerce facility has become very popular. Demands for using the network-based commerce facility to transact business have increased drastically.

Many businesses have seen this as an opportunity to expand and enhance services associated with the services provided by the network-based commerce facility. E-commerce development can be very expensive. The costs to drive traffic are high and their effectiveness is questionable. Start up companies, businesses, or developers cannot easily develop a network-based commerce facility. These parties (e.g., developers) have developed third-party applications that create programs to enhance user experience for users of the network-based commerce facility. For instance, these developers create programs that the network-based commerce facility may not have. Alternatively, these developers may wish to integrate their current applications to work with a particular popular network-base commerce facility and extend their platforms into new business areas.

These third-party application programs may be extremely valuable for users who conduct a great deal of business transactions using the network-based commerce facility and these users would like to have the information presented to attract buyers in a way that may be different from the network-based commerce facility. The developers of the type of situation mentioned above may also include businesses having many of items listed for trading activities on the network-based commerce facility and may wish to have the users interact with the network-based commerce facility through the businesses' Websites. Thus, the third-party developers may be developing the programs to expand services provided to their clients.

However, current technology does not enable easy access to the valuable data on a particular network-based commerce facility to assist in developing a third-party application. To develop the third-party application programs for these businesses' Web sites, the developers need to access the network-based commerce facility just like an ordinary user would.

FIG. 1 illustrates that like a user of a network-based commerce facility, for instance, an online auction facility 100, the developers (or through their application programs) can only access the network-based commerce facility by accessing a user interface 106. The user interface 106 contains application programs that accept requests from the all users including the developers. These application programs however, typically emit HyperText Markup Language (HTML) or other formats that enable the users to easily interact with the network-based commerce facility. The results containing the data are presented in some particular predetermined set up and layout.

The developers then have to "scrape" the results to obtain the essential data that the developers like to use. Scraping occurs when the developers interact with the database 102 through the user interface 106 to get the data that the developers like to incorporate into their applications. To do this, the developers utilize routines that search and extract the necessary elements from the HTML results. Essentially, scraping is emulating browsers such as Internet explore or Netscape that are used to interact with the user interface 106.

One problem with current technology is that whenever the layout or set up for the user interface 106, a major problem presents itself. Routines written to search and extract data received from the user interface 106 will not work when the layout or the set up is changed, even only slightly. Because the data received by third-party application are in HTML, the routine must be precise to indicate where to search and where to extract the data. A change in the layout or the set up thus leads to the need to rewrite the routines in order to extract necessary data.

Moreover, the third-party applications under the current art slow down the particular network-based commerce facility with the amount of information that these third-party applications request. One cause for that is that the third-party applications typically request for much more data than an ordinary user's request. This activity hinders other ordinary users from accessing the network-based commerce facility.

The third-party applications access the network-based commerce facility with no special access privilege different from an ordinary user. It is thus difficult for the developers to create applications that enhance user experience without undue and continuous efforts to accommodate for any changes. The developers are thus left vulnerable and their applications are consequently unreliable due to the constant changes in the set up or layout at the particular network-based commerce facility.

SUMMARY OF THE INVENTION

The present invention discloses methods and apparatuses for facilitating a programmatic access to a network-based commerce facility via a network. In one exemplary embodiment, the method includes receiving a request from a third party application via the network at the network based commerce facility. The request performs an action pertaining to electronic commerce and being one of a plurality of requests recognized by the network-based commerce facility. In responsive to the request, the method performs the action pertaining to the electronic commerce and communicates from a result of the action from the network-based commerce facility to the third party application in a programmatically accessible format.

BRIEF DESCRIPTION OF THE DRAWINGS

The present invention is illustrated by way of example and not limitation in the figures of the accompanying drawings, in which like references indicate similar elements and in which:

FIG. 5 illustrates an exemplary diagrammatic representation of one embodiment of a locations table within the database;

FIG. 9 illustrates exemplary call functions and their specific tasks;

DETAILED DESCRIPTION

Methods and apparatuses for facilitating a programmatic access to a network-based commerce facility such as, for example, an Internet-based auction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions, providing feedback, accessing e-mail, and the like.

Transaction Facility

Figure 1:
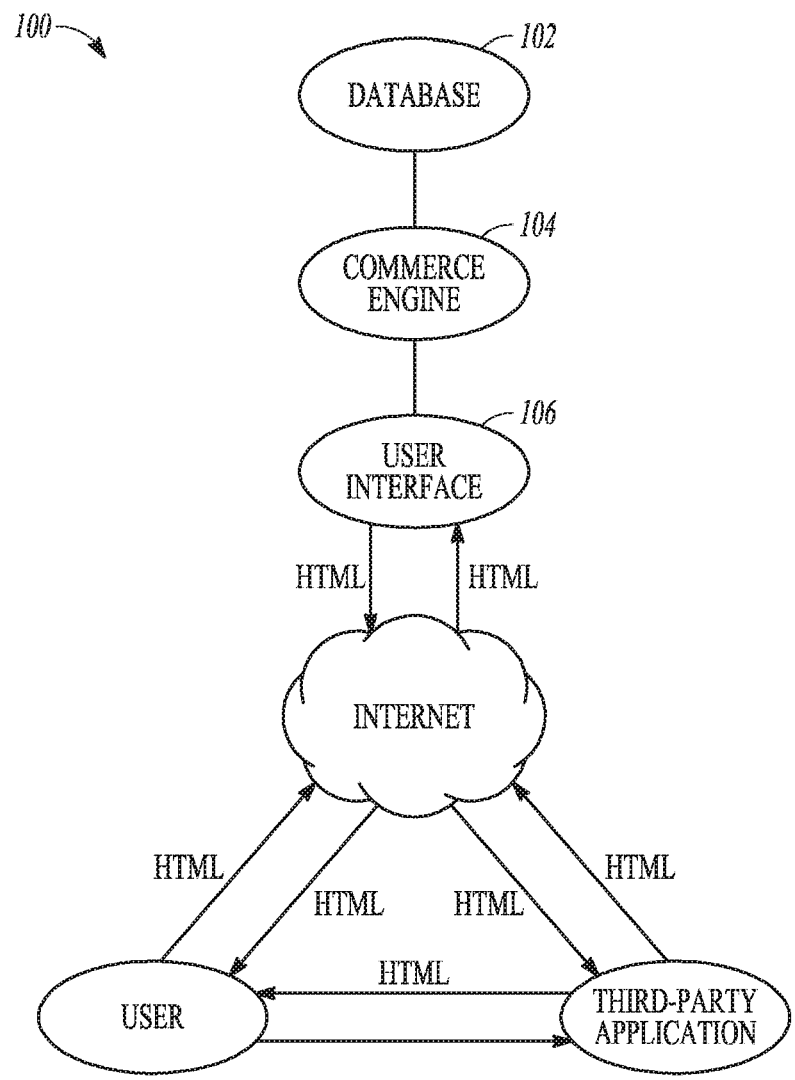
FIG. 1 is an exemplary prior art embodiment of using a third-party application to facilitate trading with network-based commerce facility through a third party.
Figure 2:
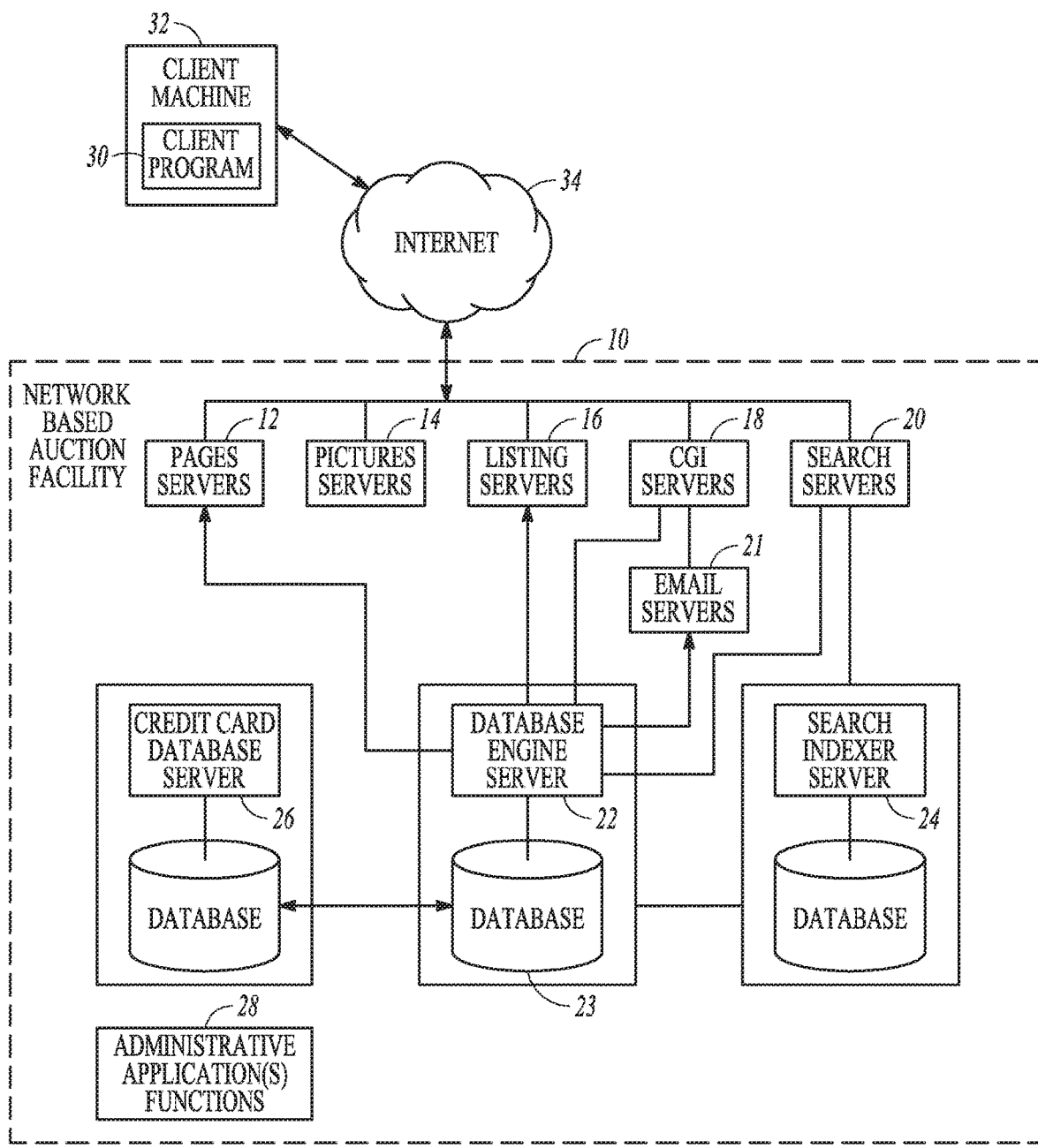
FIG. 2 is an exemplary block diagram of one embodiment of a network-based commerce facility.

FIG. 2 is a block diagram illustrating an exemplary network-based commerce facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, Computer Graphic Interface (CGI) servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database, for example, database 23.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 3:
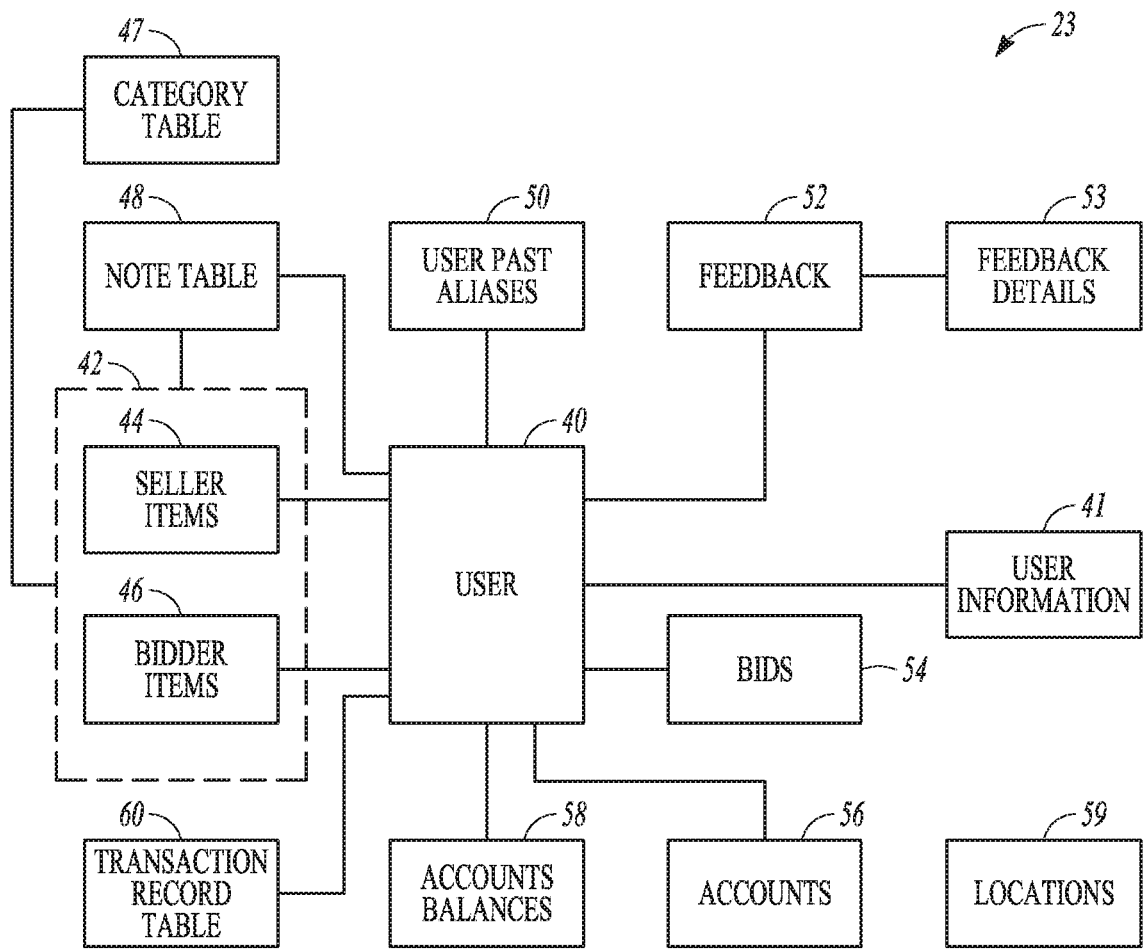
FIG. 3 illustrates an exemplary block diagram of one embodiment of a database maintained by a database engine server.

FIG. 3 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60. In addition, the database 23 includes a location table 59 which stores valid demographic information that is used to verify registration information submitted by users during the registration process.

Figure 4:
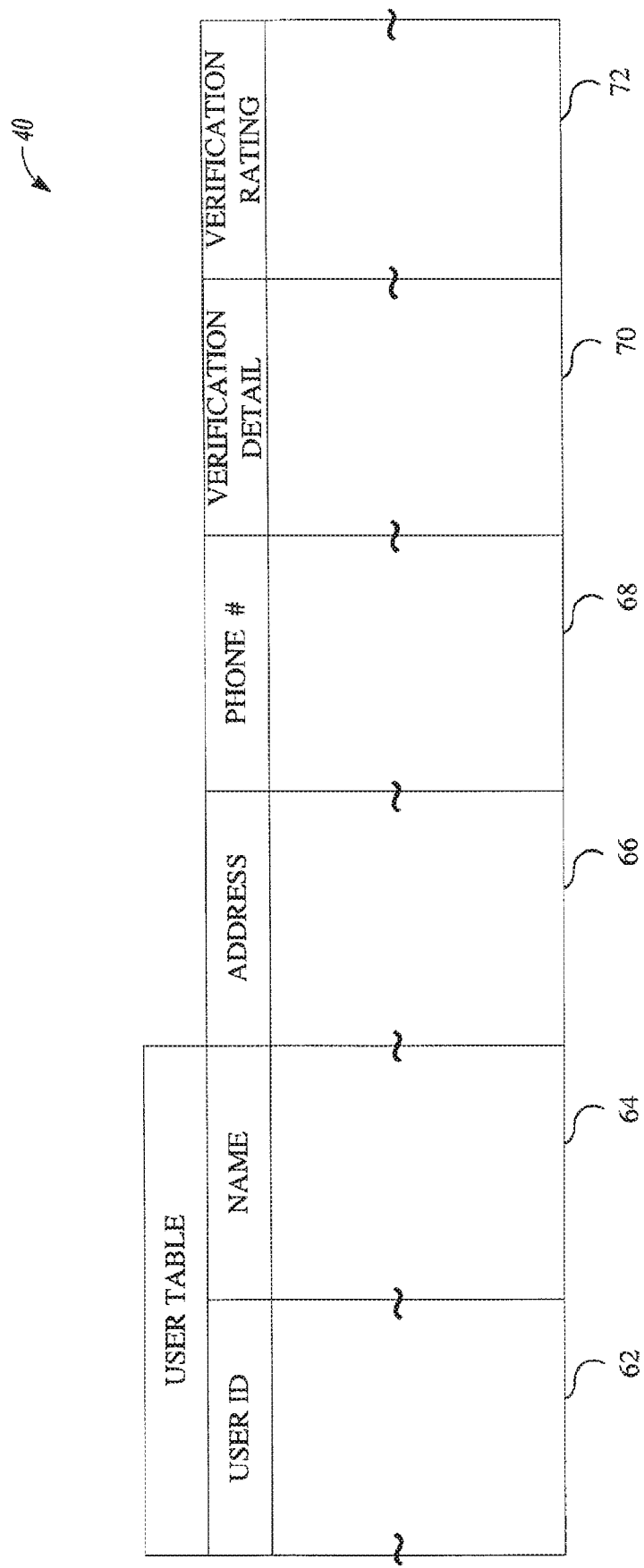
FIG. 4 illustrates an exemplary diagrammatic representation of one embodiment of a user table within the database.

FIG. 4 is a diagrammatic representation of an exemplary embodiment of the user table 40 that is populated with records, or entries, for each user of the auction facility 10. The table 40 includes a user identifier column 62 that stores a unique identifier for each user. A name column 64 stores a first name, a middle initial and a last name for each user. An address column 66 stores full address information for each user, e.g. a street name and number, city, zip code, state, etc. A phone number column 68 stores a home phone number for each user. It may be desirable to have each user verified, for example, through some identity checking process to verify that the user is who it is purporting to be prior to granting access to a particular user. Verification detail column 70 and verification rating column 72 may be included in the user table 40 to indicate details and rating of each individual's verification process.

It will be appreciated that any information other than that described above may populate the user table 40 without loss of generality.

FIG. 5 is an exemplary diagrammatic representation of an embodiment of the location table 59. The location table 59 stores a list of current zip codes and associated location information. In one embodiment, the data stored in the location table 59 is imported from a commercial database and is periodically completely re-populated with a new release of the commercial database. Alternatively, the data stored in the locations table 59 is obtained from various sources including various commercial databases and/or the auction facility 10 itself. The table 59 includes a zip code column 80 that stores a list of current zip codes in the U.S. and abroad. Each zip code corresponds to a valid city information stored in a city column 82. A flag stored in a column 102 indicates whether the city information stored in the column 82 is for a main city or an alias city. The zip code information stored in the column 80 is also correlated with areas code information stored in an area code column 92 and with other location information stored in a state column 84, country name column 86, country code column 88, country column 90, time zone column 94, latitude column 98, and longitude column 100. A column 96 includes a flag indicating, for each entry, whether daylight savings time is adopted in this geographic area. A source column 104 stores a value indicating the source of the record, i.e., whether the record was imported from a certain commercial database, created by an administrator of the auction facility 10, or was originated by other source.

It will be appreciated that other demographic information may also populate the location table 59.

Figure 6:
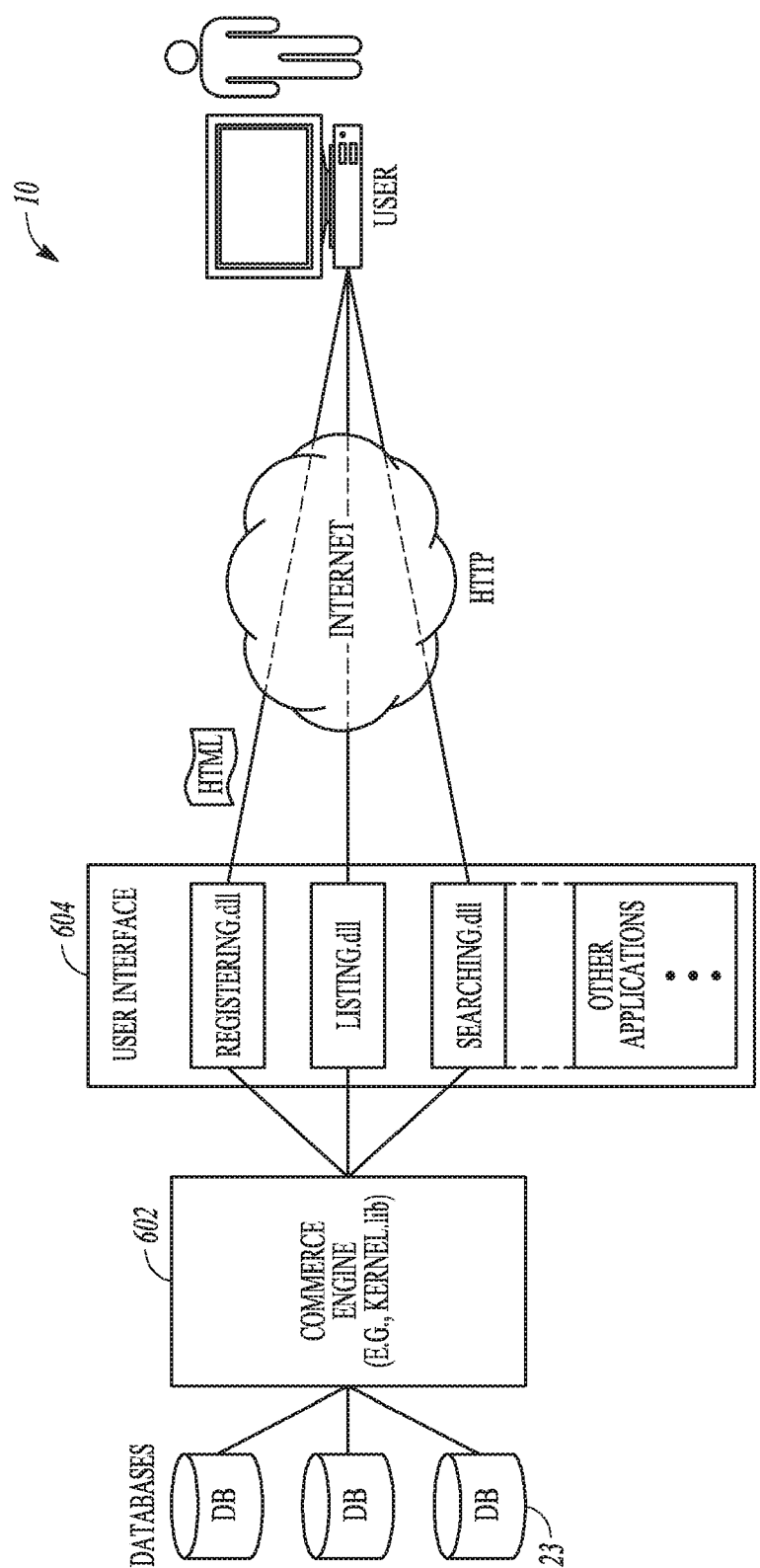
FIG. 6 illustrates an exemplary block diagram of a network-based commerce facility of the present invention.

In another embodiment, the auction facility 10 can be described as illustrated in FIG. 6. The database 23 stores all of the information (e.g., user records, item records, etc . . . ) maintained by the auction facility 10 as discussed above. A commerce engine 602 is further coupled to the database 23. The commerce engine 602 contains all of the business logic, for instance, how the auction for the auction facility 10 works. This includes rules such as how to calculate the highest bid, to set the minimum bid for a particular item, determine what fields are necessary and optional for a particular item, or in short, all of the logic of how to manage the auction facility 10. The commerce engine 602 functions based on program codes that are configured to access the information stored in the database 23. The codes can be written in any suitable programming language that can access the information stored in the databases 23 for instance, in C++ language.

Continuing with the embodiment shown in FIG. 6, a set user interfaces 604 is coupled to the commerce engine 602. The set of user interfaces includes application programs that are run from the commerce engine 602 that provide user interface for the auction facility 10. For example, when a user visits a web site belonging to the auction facility 10, the user interacts with the user interface application programs included in the user interface 604 which essentially provide a browser for the user to interact with. In one example, the browser presents a humanly readable interface for the user to interact with the auction facility 700. Through the application programs, (details below) the user can interact with the commerce engine and the database to obtain or submit the desired information. After the data are extracted from the database, the data are presented to the user in the human readable format for interaction. One well known example of a data format that can be presented to the user for such interaction is called Hyper Text Markup Language (HTML). HTML defines the page layout, font, graphic elements as well as hyper links to other documents on the website of the auction facility 10. (See example in FIG. 8).

A user of the auction facility 10 is typically connected to the Internet via any suitable method, for instance, through a conventional cable and a modem, wireless access modem and an antenna, etc. A user can also be a computer with programs to act on behalf of the actual user. Typically, the user is connected to the Internet by issuing to the auction facility 700 a HyperText Transport Protocol, (HTTP) well known in the field. HTTP is a communication protocol used to connect to servers on the WorldWideWeb, for instance, servers 12, 14, 16, and 20 of the auction facility 10. HTTP also transmits HTML pages to browsers utilized by the user to access the auction facility 10.

Programmatic Access

The programmatic access application of the present invention facilitates a programmatic access to a network-based commerce facility via a network. The method includes receiving a request from a third party application via the network at the network based commerce facility. The request pertains to an electronic commerce action and is one of a plurality of requests recognized by the network-based commerce facility. In response to this request, the network-based commerce facility performs this action and communicates the results to the party application in a programmatically accessible format.

Figure 7:
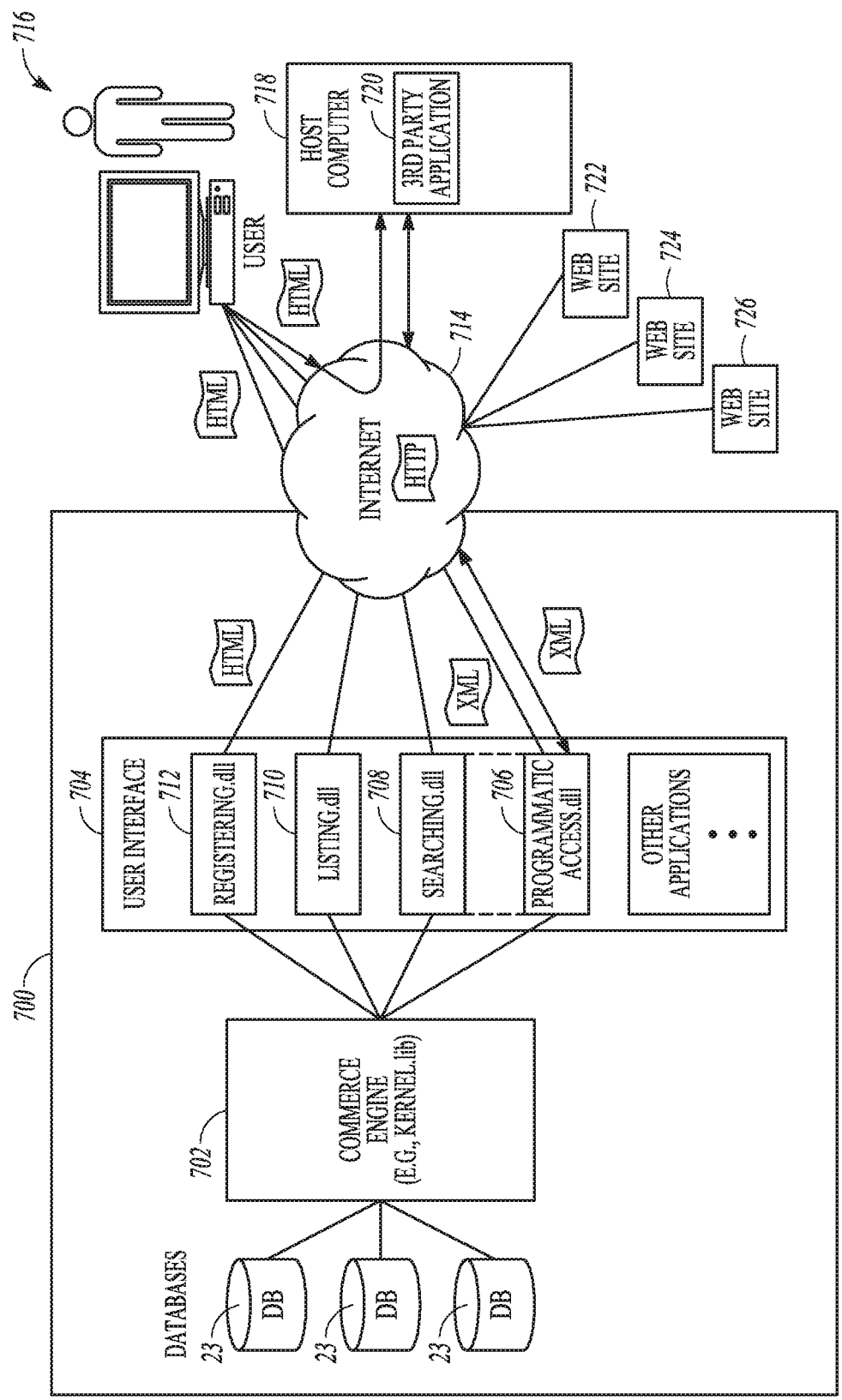
FIG. 7 illustrates an exemplary block diagram of the present invention showing a network-based commerce facility having a programmatic access application for access by a third-party application.

FIG. 7 illustrates an exemplary embodiment of the present invention in which a programmatic access application is incorporated into the auction facility 700. The programmatic access application includes a method and a system to grant a sanctioned access to the third-party applications that wish extract data from or submit data to the auction facility 700, on behalf of some user(s).

In one exemplary embodiment, a sanctioned access means that only those applications with a granted access can access the programmatic access application. Exemplary methods of granting a sanctioned access include manual authorization (e.g., telephone registration, mail registration, and registration in person), electronic authorization (e.g., electronic email), or any other convenient methods of allowing access to a database known in the art. In one example, the programmatic access application 706 is only available based on a pre-authorization scheme. In such an event, the third-party application must have been granted an authorization to access the programmatic access application 706. The pre-authorization scheme may also be a business model set up by the auction facility 700 to charge for access based on a predetermined model. In yet another example, the auction facility 700 may charge less for access to the programmatic access application 706 at off-peak hours and more for traffic hours (on-peak hours).

As will be apparent below, the auction facility 700 of the present embodiment enables the developers to use the third-party applications to easily extract raw data from the auction facility 700 to customize their own e-commerce trading over the Internet.

In the exemplary embodiments, the programmatic access applications enables the third-party applications to act as intermediary between users and the auction facility 700. The third-party applications further facilitate a customized interface for businesses to convey information between the auction facility 700 and the users. The customized interface provides functionality and specialized operations not otherwise afforded by the auction facility 700 interface, such as an application designed for specific business needs.

A third-party application of the present embodiment may extract data from the auction facility 700 in their raw format to enable easy integration of the data into other applications having no association with the auction facility 700. This data extraction is done through the programmatic access application. The third-party application may submit data to the auction facility 700 on behalf of users or other applications that wish to submit items to the auction facility 700 for e-commerce trading purposes.

The third-party application may reside on a computer host 718, which communicates to the auction facility 700 via a network, e.g., the Internet 714. The third-party application may also communicates to a machine used by a user 716 via a network, also, e.g., the Internet 714. The third-party application may communicate to the machine through some other manner, e.g., a local software, an intra-network connection, or a local trading facility. Alternatively, the third-party application may reside in the same machine as the one used by the user (e.g., a user 716).

The following sections discuss in details the various embodiments of the present invention.

In one example, the auction facility 700 includes databases 23, a commerce engine 702, and a user interface 704. A user 716 interacts with the auction facility 700 via the user interface 704. The databases 23 are similar to the databases described with regard to FIG. 2 above. The commerce engine 702 is similar to the commerce engine 602 described above. The user interface 704 includes several applications that the user 716 can interact with. For example, the user interface 704 may include a registering application 712, a listing application 710, a searching application 708 and other applications not shown.

In one example, these applications have file formats called "Dynamic Link Library" (DLL) having the extension ".dll." As well known, DLL applications are executable program modules that perform some functions. When needed, these DLL applications are called for by a running application (not shown) and are loaded to perform any specific functions. Thus, upon requests submitted to the auction facility 700, the appropriate application program is executed to perform the function requested.

The user 716 of the auction facility 700 sends request to the auction facility 700 through the Internet 714. In one example, all of the requests coming from the user 716 and results returning from the auction facility 700 are transported via HTTP and in the HTML format. It will be appreciated that other formats could be possible so long as the formats enable the user 716 to interact with the auction facility 700 in an easy and convenient manner, (e.g., in a humanly readable format).

As mentioned above, data in the form of HTML contains presentation specifications including fonts, layout, set up, etc. HTML data includes codes to define the format, change or hypertext links. Typically, HTML tags are surrounded by the angle bracket (e.g., <element>). HTML format is one of the most popular presentation languages used to present data in the World Wide Web. For instance, the auction facility 700 may have web sites or web pages that are built with HTML tags which defines the page layout, font, and graphic elements as well as the hypertext links to other documents in the World Wide Web. The user 716 thus interact with these web pages when conduct trading with the auction facility 700.

In the present invention, the user 716 can interact with the auction facility 700 via the third-party application. The third-party application resides on a host computer 718 with a connection to the auction facility 700 and sends requests to the auction facility 700 in a format that enables the third-party application to reach a programmatic access application 706. The programmatic access application 706 is one of the application programs included in the user interface 704. It is preferred that the programmatic access application 706 is dedicated to communicating only with the third-party application.

In a preferred embodiment, the data communicated through the programmatic access application 706 have formats that are specified and recognized by the auction facility 700. Furthermore, a program is needed to submit or access the data or to access the results. The format specified by and recognized by the auction facility 700 is one that enables exchanges of raw data. In this embodiment, the data transferred under this format do not contain presentation specification such as layout setup, or font such as that seen in the HTML format. Instead, the core of the data contains the values that the third-party application needs in order to set up its own presentation of the data to the user 716.

In this preferred embodiment, an XML format is used to transfer data between the third party application and the auction facility 700. The requests sent from the third-party application are in this format which, does not specify any font, layout, or set up, (e.g., XML). Likewise, the results returned to the host computer 718 by the auction facility 700 are in the same formats (e.g., XML). Raw data is thus transferred between the auction facility 700 and the third-party application without any layout or set up specification.

Figure 8:
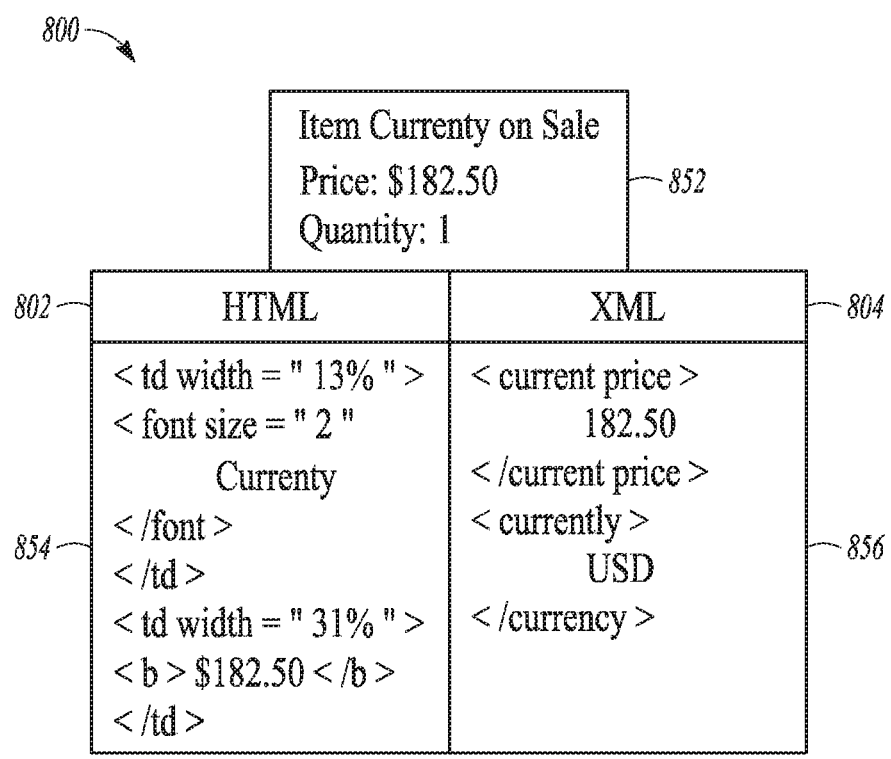
FIG. 8 illustrates exemplary differences between an HTML data record and an XML data record.

FIG. 8 shows a table 800, which illustrates some basic differences between an HTML record 802 and an XML record 804. As well known, the HTML stands for HyperText Markup Language including tags to specify how data looks (e.g., layout, setup, and font) and the XML stands for eXtensible Markup Language including tags to specify the data values. Both languages are well known in the Internet community.

FIG. 8 illustrates an example of a listing of an item in HTML and XML formats. In example 852, an item is currently on sale, for the price of $182.50 with quantity being 1. A user may have requested for a specific category and this item is being the only one listed under this category. An HTML record 802 is what the user ultimately receives. When the user makes a request through the third-party application, and the third-party application submits a request on behalf of the user to the auction facility 700, an XML record 804 is what the third-party application receives. As shown in the table 800, tags in the HTML record 802 specify name of the item and the price for the item each with font size and font width information. On the other hand, the XML record 804 only specifies the values. Thus, the extraction of the actual data values from the XML record is easier than that of the HTML record.

It will be appreciated that table 800 is only an illustration, the HTML record 802 and the XML record 804 may specify much more information than shown without deviating from the scope of the present invention. In any event, the results from an XML record 804 are much more simple and short.

An HTML record is bulky. Thus, it is difficult to extract useful data values (e.g., prices, quantities, and item names) from an HTML record. In an HTML record, the data are intermixed among specification tags, which are not useful to those third-party applications, which only have needs for the actual data values. In order to extract the data values that came in the HTML record, a search must be conducted to find the useful data values and then the values can be extracted for further use. An XML record, on the other hand, is not bulky and is much easier for value extractions. To obtain the useful data, the XML record only needs to be parsed using any conventional parser currently available. The extraction of the data values from the XML record does not involve dealing with the unnecessary or undesirable extraction of the values from other information such as set up or layout specifications that come with the HTML record.

In one exemplary embodiment, the user 716 accesses information from the auction facility 700 by sending an HTML request to the third-party application. This may occur when the user 716 is a client of the third party application and wants to participate in trading transactions occurring in the auction facility 700 through the third-party application. In one example, the third-party application is developed for a business that has many items listed for sale in the auction facility 700. And, the business wishes to integrate data from the auction facility 700 with the business's own applications. Moreover, these applications may not be available in the auction facility 700. The business thus uses the third-party application to facilitate trading of items that it posts on the auction facility 700 together with offering these applications to its users. In some instances, the business may like to have its own clients conduct trading using new technology not yet available on the auction facility 700, such as handheld devices or Web-enable devices (e.g., phones, pagers, and more). The programmatic access application 706 thus, facilitates the third-party application in collecting the necessary trading data from the auction facility 700 to present them to the clients of this business in any customized form.

In one embodiment, the programmatic access application 706 is a user interface application residing on the user interface 704 of the auction facility 700. The programmatic access 706 enables the third party application to access the auction facility 700 in a way that is different from the way user 716 accesses the auction facility directly. For instance, as shown in FIG. 7, the user 716 interacts with the auction facility 700 via the Internet 714 with an HTML format request whereas the third-party application interacts with the auction facility 700 via an XML format request. The data that the user 716 obtains directly form the auction facility 700 has layout and set up specifications such that the user 716's browser can display the data in a form that enables the user 716 to immediately interact with the auction facility 700. The data that the third-party application obtains contains values (e.g., raw data) with no presentation specification on how these values will be presented. The values can thus be easily extracted and manipulated into any customized form to be incorporated into other websites.

In one embodiment, the user 716 sends a request to the third-party application via a network connection (e.g., Internet 714). The request pertains to an electronic commerce transaction, which is one of a plurality of requests that are recognized by the auction facility 700. In another example, the request is also one of a plurality of requests recognized by the business that utilizes the third-party application. A few examples of the request are actions in which the user 716 requests to register as a new or return user, sell an item, trade an item, buy an item, obtain information, submit information, update submitted information, or access a user profile with the auction facility 700. All of these requests ultimately reach the auction facility 700 but they must first go through the third-party application.

More specifically, the request can be an action that requests the third-party application to put an item up for sale or auction, re-list the item, change the item's attributes, check for errors before submitting the item, add text to a description field for a listed item, or search for listed items. The request can also be an action that requests the third-party application to retrieve auction fees associated with the listing items for sale, information about a listed item, all items listed in a particular category, list all the items a particular end-user is selling, or list all of the items a particular user has bid on. The request can also be an action that requests the third-party application to a list of high bidders for an auction, information about a single user, feedback scores for a single user, a URL to a logo of the auction facility, an official time from the auction facility or to leave feedback about a user. Further, the request can also be an action that requests the third-party application to activate a test user, and to retrieve the custom categories, account information for a user, and a watch list of the user. And, the request can be any information that the user needs to submit to the auction facility, for example, a feedback on a particular user, new items for sale and new account for the user. In one example, the request sent by the user 716 to the third party-applications can be in the HTML format transferred over the HTTP transport.

The third-party application 718 then sends an appropriate request to the auction facility 700. Unlike the requests from the user 716 to the third-party application, the appropriate request sent to the auction facility 700 has to be in the format specified by the programmatic access application 706 and in one example, such format is an XML format. The appropriate request requests to perform an action pertaining to electronic commerce and is one of a plurality of requests recognized by the auction facility 700. The appropriate request is also an action that the third-party application submits on behalf of the user 716. For instance, this request requests to register the user 716 as a new or return user, sell an item, trade an item, buy an item, obtain information, submit information, update submitted information, or access a user profile that the user 716 wishes to do with the auction facility 700 but through the third-party application.

In another embodiment, the user 716 does not need to know that the third-party application 718 is actual an intermediary between the user 716 and the auction facility 700. The user 716 interacts with a user interface that is different from the user interface 704. This user interface can be one that is custom-designed for a particular business that has its own unique applications and now wishes to incorporate the trading on the auction facility 700 into the business's applications. The user interface that is set up using the data obtained through the communication between the auction facility 700 and the third-party application is designed such that the data integrate into the user interface with no reference to the auction facility 700. The user can interact with this user interface not realizing that the data actually was obtained through a third-party application which submitted request to the programmatic access application 706. The interaction occurs in real time such that no dramatic delay is experienced due to the different way that data is obtained, e.g., through the third-party application and the programmatic access application 706.

The appropriate request sent by the third-party application can be an action that requests the auction facility 700 to put an item up for sale or auction, re-list the item, change the item's attributes, check for errors before submitting the item, add text to a description field for a listed item, or search for listed items on behalf of the user 716. The request can also be an action that requests the auction facility 700 to list auction fees associated with the listing items for sale, information about a listed item, all items listed in a particular category, all the items a particular end-user is selling, or all of the items a particular user has bid on. The request can also be an action that requests the auction facility 700 to get a list of high bidders for an auction, information about a single user, feedback scores for a single user, a URL to a logo of the auction facility 700, an official time from the auction facility 700 or to leave feedback about a user. Further, the request can also be an action that requests the auction facility 700 to activate a test user, and to retrieve the custom categories, account information for a user, and a watch list of the user. The request can also be any information that the third-party application needs to submit on behalf of the user 716 such as a feedback on a particular user, new items for sale and new account for the user.

In responsive to the request sent by the third-party application, the auction facility 700 performs actions that pertain to the electronic commerce as per requested by the third-party application. When the actions are completed, the auction facility 700 communicates a result to the third party application. The result is in a programmatically accessible format having no setup of layout specification.

In one embodiment, the result is programmatically accessible because the third-party application must work with an interpreter. In one example, the interpereter is an application routine that can interpret the results, for example, a local application routine. In an alternative embodiment, the third-party application itself includes an interpreter having the capability to interpret the results and as such no other application is necessary. Either way, the interpreter can be an application routine written to parse the result and in doing so, the routine must know how to interpret the result in the format specified by the programmatic access application 706. The routine, however, needs not be written to search for the result through the setup and/or layout as in the case of an HTML data. In one embodiment, the parser must recognize various nesting levels of element tags and what they represent. The parser must recognize a start tag for a function-specific element. The parser must know that another element or elements always follow the start tag. The elements may contain actual data value that that parser needs to read and parse. Further, the parser must be able to distinguish a component family element's tag, and understand that following it will be either a data element of that family or another component element in that family definition.

One exemplary routine is an XML parser which is designed to parse (e.g., interpret or translate) the data. It will be appreciated that other parser can be used. The necessary parser will depend on the type of the data format specified and accepted by the auction facility 700.

In another embodiment, the third-party application sends requests that are referred to as call functions. Each call function specifically requests the auction facility 700 to perform a particular task specified by the call function. An exemplary call function directs to an electronic commerce transactions occurring in the auction facility 700. These transactions may include user registration, information submission, information retrieval, information update, a sale, a purchase, an auction, a feedback comment, an access to user profile, or an access to user information such as emails, to name a few. The auction facility 700 can specify as many call functionals as desired for its e-commerce purposes.

FIG. 9 illustrates examples of call functions performed at the auction facility 700. In one example, the functions are application routines specified and recognized by the programmatic access 706. In these examples, the call functions are easy to use functions that can perform e-commerce related tasks called through the HTTP transport protocol. In this example, a standard XML record is used to transport information (e.g., requests and results) between the third-party application and the auction facility 700 via the HTTP transport protocol.

AddItem function 902 is sometimes referred to as "Sell your item." The AddItem function 902 sends a request to a platform of the auction facility 700 to put an item up for sale. Input arguments for the AddItem function 902 define the item being placed on-sale, payment methods accepted, shipping regions, how the item is displayed in the on sale lists (featuring), and more. An item submitted through AddItem function is visible on the facility through the normal interface (e.g., the user interface 704). When the user 716 uses the auction facility 700 through the third-party application, the item submitted through this function is also visible on the user interface associated with the third-party application.

VerifyAddItem function 904 uses the same input arguments as the AddItem function 902. The VerifyAddItem function 904 tests a listing of an item for sale without actually submitting the item to the facility platform. Under this call function 904 the AddItem function 902 can be tested for accuracy and errors before actually submitting. Also, the VerifyAddItem function 904 returns the fees that would be assessed for the item's listing, giving a preview of the costs for listing the item.

GetItem function 906 is sometimes referred to as "View Item." The GetItem function 906 is used to query to the facility platform and retrieve the information for an item. The GetItem function 906 returns the information about the item in a stream that the local application routines use for display. Information returned by GetItem function 906 is the same as seen on the main facility site, except the item's attributes are returned as raw data without the visual formatting of the facility's website. An example of a format of the information returned is XML.

RelistItem function 908 resubmits an item for which a previous for sale listing failed to sell. Attributes associated with the item listed carry over to the new listing. This is as opposed to using the AddItem function 902 to create the new listing, where all of the attributes must be specified again. Also, the fees associated with a relist auction are different from a completely new for sale listing.

ReviseItem function 910 allows for changing a subset of attributes of an item that has been listed for sale. The function 910 works on items in currently active on the for sale listings, but changes can only be made prior to the first bid being placed against the item. This function 910 is most important for items that have not elicited bids, to make the items more enticing and appealing to users viewing the items.

GetSellerList function 912 queries requests to the platform of the facility and retrieves a list of the items a specified user is selling. An input argument is provided to specify a particular user whose listings are of interest.

GetBidderList function 914 queries requests to the platform of the facility and retrieves a list of the items on which a particular user has placed a bid. An input argument is provided to specify the particular user bidding on the items.

GetUser function 916 queries requests to the platform of the facility and retrieve abbreviated information for a particular user. An input argument is provided to specify the particular user. The GetUser function 916 also retrieves information such as the website the particular user is registered with and the date he last changed his user information. The website in this example can be at the third-party applications that have integrated the information available on the auction facility into these applications.

GetFeedback function 918 is sometimes referred to as "View Feedback." The GetFeedback function 918 queries requests to the platform of the facility and retrieves abbreviated or extended feedback (View Feedback) score information for a specific user.

LeaveFeedback function 920 is available for a user to submit positive, negative, or neutral feedback information about a particular user after the conclusion of a transaction. This feedback data can later be retrieved by other users to evaluate the rated user regarding the desirability of doing business with that user. Feedback data is retrieved by the GetFeedback function 918 discussed above. GetCategories function 922 GetCategories retrieves a list of all subcategories that are direct children category nodes to a specified parent category. The parent category is specified in an argument such as CategoryParent input argument. The categories returned can be those categories specified in a particular web site and an input argument such as a SiteId argument can be used to submit the request.

GetCategoryListings function 924 returns the items listed (e.g., or sale or for auction) in a specific category. In one example, the output is returned as a multi-item XML result set that can be ordered by select fields and that can be paginated. Each item retrieved is returned with a limited subset of the totally item attributes.

GetSearchResults function 926 searches for items on the platform of the auction facility. Input arguments may provide criteria that the auction facility uses to perform the search and return items that bear those criteria. Items in active listings that meet the specified criteria are returned in the function's result set and in one example, in the XML format.

GetOfficialTime function 928 queries requests to the platform of the auction facility and retrieves the official time when the function is called.

GetLogoURL function 930 is used to query requests to the platform of the auction facility and retrieve the logo images, possibly of different sizes: small, medium, or large. In one example, the third-party applications use the URL returned by GetLogoURL function 930 to display the logo of the auction facility on the hosting Web page the web site that uses the third-party application to access the auction facility.

GetTransactionHistory function 932 queries requests to the platform of the auction facility to retrieve of all the transactions associated with a fixed-price auction occurring through the auction facility. Each purchase of an item listed in the fixed-price auction category constitutes a transaction. The function 931 thus returns a list of all of the items purchased in the fixed-price auction.

AddToItemDescription function 934 appends text to description field an item listed for sale. AddToItemDescription function 934 also provides the ability to add, delete, or change the hit counter associated with a listed item. Adding text to a listed item's description and changing its hit counter specification can be done together in a single call or only one of these operations may be performed.

GetAccount function 936 allows a user to retrieve information about their account with the auction facility. A single call to the GetAccount functions 936 retrieves one of two types of reports: period or invoice. A period report includes transactions that occurred within a specified time period. Input arguments are provided to define this time period. An invoice report may be information pertaining to a monthly invoice. Arguments are provided to specify the month and year identifying the invoice.

Many of the call functions described above are visible on the facility of the auction facility 700 as well as the user interface associated with the third-party application.

In a preferred embodiment, the third-party applications also includes local application routines 720 (FIG. 7) that are programmed to receive and manipulate results returned at the completion of tasks pertaining to the function calls. The routines 720 can be an HTML record, or CGI program written in C++, Perl, Pascal, or any programming language capable of issuing data requests through the Internet 714. The routines 720 interact directly with the user 716. The requests generated by the routines 720 present data to the user 716 in a humanly understandable format.

The user 716 runs the local application routines 720 which is included in the third-party applications in order to conduct trading with the auction facility 700 via the host computer 718. The third-party application issue requests that communicate to the call functions recognized by the programmatic access 706. The requests send information to and request for information from a platform of the auction facility 700, here, the databases 23. The requests request the auction facility 700 to perform a specific tasks called for by the call functions indicated in the requests. When the auction facility 700 completes the specific tasks, the auction facility 700 returns results to the third-party application. The local routines 720 receives and manipulates these results in order to send an HTML record to the user 716.

Through sending and getting the information discussed above, the user 716 is able to conduct trading via the third-party application essentially in the same way the user 716 conducts trading directly with the auction facility 700.

In another embodiment, the third-party application is installed in a machine used by the user 716 to perform trading. The same methods above would apply to this embodiment.

In a preferred embodiment, the call functions are made through separate HTTP requests strings that are sent to the programmatic access application 706. As discussed, the requests are in the XML data format or any other data format specified by the auction facility 700 that is able to convey data in an unformatted version, (e.g., raw data having no setup and layout specification). The data format must enable easy and simple extraction of the data values with no interference from the layout or set up presentation encountered by the HTML data format.

In one embodiment, a format of a function call request varies depending on the programming language used to create the application. In general, after the XML string has been composed, the request string needs to be conveyed to the auction facility 700 using the HTTP transport protocol. One exemplary format is shown below in which Perl language is used to create the XML string request. In one example, the third party application makes a GetItem function 906 which may have the format below.

```
<?xml version='1.0' encoding='iso-8859-1'?>
<Request>
    <RequestUserId>JoeB</RequestUserId>
    <RequestPassword>SecretWord</RequestPassword>
    <ErrorLevel>0</ErrorLevel>
    <DetailLevel>0</DetailLevel>
    <Verb>GetItem</Verb>
    <Id>268151</Id>
</Request>
```

When a task associated with a particular function call is completed, the auction facility 700 generates a result and returns it to the third party application. The result may have the following exemplary format. (The result below is a response to a GetUser function 916).

```
<?xml version="1.0" encoding="iso-8859-1" ?>
<AuctionFacilityName>
    <AuctionFacilityTime>2000-08-25 5:13:40</AuctionFacilityTime>
    <User>
        <AboutMe>0</AboutMe>
        <BillpointRegistered>0</BillpointRegistered>
        <Email>usaAuctionFacility@aol.com</Email>
        <IDVerified>1</IDVerified>
        <SiteId>0</SiteId>
        <Star>0</Star>
        <Sunglasses>0</Sunglasses>
        <UserId>usa5</UserId>
        <UserIdLastChanged>1999-01-13 06:15:27</UserIdLastChanged>
    </User>
</AuctionFacilityName>
```

When the auction facility 700 completes the tasks pertaining to the call functions the results are returned to the third-party application as an XML record. The results are also returned to the third-party application through separate HTTP strings.

In one embodiment, the results, which are returned as per call functions are then parsed and manipulated by the local application routines 720. It will be appreciated that the third-party application may itself parse and manipulate the results. The local application or the third-party applications have routines that are able to interpret, analyze, or interpret the results using any application that can parse the results. These routines are also capable of rearranging the necessary information into a particular format recognized and understood by the user 716. After parsing the results, these routines can arrange the data into a setup or layout and incorporate them into a customized user interface. Those applications thus manipulate the results and make the results available to the user 716 through a user interface application associated with the third-party application.

In one exemplary call function, the GetItem function, data values can be displayed into individual fields such as the name of the item (the Title field), the starting price for the item (StartPrice), and the number of items being sold (Quantity). The data values can be displayed on the display window created and customized for the individual business that uses the third-party application. In one example, a picture of the auction item is also displayed using the URL returned in a PictureURL field. Some of the return values may lend themselves to other types of visual controls, like checkboxes and radio buttons. For example, the payment options the seller has specified for an item (like the PaymentMOCashiers, PaymentPersonalCheck, and PaymentBillpoint fields) can be displayed using checkboxes.

The data retrieved through the auction facility 700 can be presented to the end-user a number of ways. One way to present the data is with an HTML page which is programmatically composed using the data values that are returned from the programmatic access application 706. The page might consist of an HTML form, with individual data values displayed in the various visual controls HTML forms support, like: text, checkbox, radio, and image. This approach allows the data obtained through the programmatic access application 706 and the third-party application to be presented in a standard HTML browser to the user. In another example, a CGI or other programming interface may be needed to send the HTTP requests, parse the returned data, and to dynamically compose the HTML page on which the data is to be displayed.

In another embodiment, a compiled program is used to present the retrieved data to the user. The compiled program has capability to send HTTP protocol queries and receive the data that these function calls produce. The program then uses visual controls native to the application's host environment to display and edit the returned data. In one example, an application can be created in C++ for the Microsoft Windows environment. Native Windows controls like edit boxes, radio buttons, and checkboxes are used to present the retrieved information to the end-user. This approach also allows customized interface such as allowing for custom controls, like data grids, to be used for the display of data.

In an alternative embodiment, the programmatic access application also includes routines to handle erroneous requests. Routines having capabilities to handle error facilitate and enhance robustness in the local application routines. Functions return error code indicate failure of a particular function call. In addition to simple error codes, the local application routines can opt to receive brief or verbose text error messages. With this option, the web site using the third-party application to incorporate data from the auction facility can be protected from erroneous entries thus, enhancing reliability of the web site.

In another embodiment, the local application routines includes instructions that can arrange the raw data into a customized user interface that integrates applications from the third-party application 718 with the information obtained form the auction facility 700. The customized interface provides specialized operations designed for specific business needs that may not be available on the auction facility 700.

Businesses or startup companies wishing to expand their business services may incorporate an already popular auction facility directly into their own web sites. This also allows these businesses or companies to sell items of their own, along side with the popular auction facility. Most important, tradings are conducted in a user interface having custom and unique deigns specifically tailored for the needs of these businesses or companies.

Additionally, these businesses can implement custom functionality related to an auction facility without needing to implement the platform of the auction facility. These businesses can also develop these custom auction or trading applications as boxed software for sale to other companies.

Moreover, these businesses or companies may integrate their own products with those products offered on an auction facility to other companies.

The programmatic access call functions can be customized in that the third-party applications can specify and control the amount of information returned from the auction facility.

The programmatic access enables the local application routines to interact with the user. The user interacts with the third party application in essentially the same way as with the auction facility and in some cases, with many more advantageous features not available in the auction facility.

In yet another embodiment, the programmatic access application 706 is protected by a security scheme. The security scheme centers on the use of session certificates that uniquely identify a particular third-party application and verify that the third-party application has authorized access. The session certificates can be issued by a special security management agent associated with or being at the auction facility 700 (not shown). In one example, each of the session certificates is string of characters unique to the particular third-party application. Under this scheme, with each function call, the session certificate for a particular third-party application is passed along to the security management agent. The name of the party identified the third-party application is included in the session certificate. The function call is then authenticated using any conventional security method, e.g., digital certificate authentication. For example, the security management performs a look-up based on these values (the name, the session certificate and the function call) to determine whether the third-party application is authorized to use the attempted function call.

Figure 10:
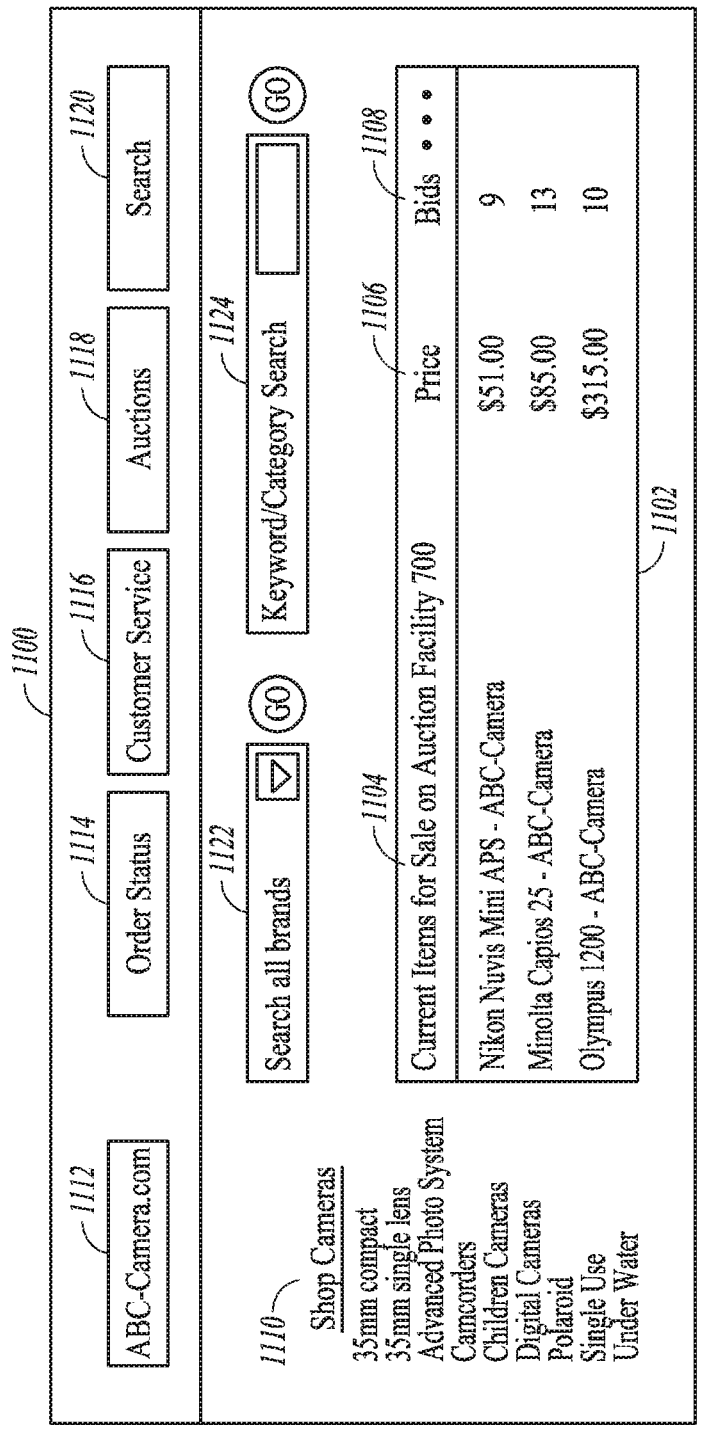
FIGS. 10 and 11 illustrates examples of online businesses that can utilize a third-party application of the present invention to incorporate a popular network-based commerce facility into their own applications.

FIG. 10 illustrates an example of a business that employs the third-party application to integrate the information on the auction facility 700 into the applications already available on the business's web site. The web site 1100 of the present example provides several services to users of the web site 1100. The web site 1100 is an on-line camera shop, for example, ABC-Camera.com 1112. The ABC-Camera.com 1112 may have many applications that it offers to its clients, for example, order status 1114, customer service 1116, search 1120, shop cameras 1110, and search application 1122 including keyword or category search 1124. The ABC-Camera.com 1112 may wish to host auctions 1118.

As discussed above, configuring the web site to be able to host auction is expensive to say the least. Instead, the ABC-Camera.com 1112 may submit the items that it has available for auction to the auction facility 700. The ABC-Camera.com 1112 then allows user to conduct trading directly over the web site 1100.

The third-party application in this case can be a local routine application connecting to the web site 1100. When a user of the ABC-Camera.com 1112 submits a request to the web site 1100, for example, request a listing of all of the current items (e.g., cameras) listed for auction, the information presented in the box 1102 appears on the web site. For example, three cameras are currently listed for auction at the auction facility 700. The price 1106 and the number of bids 1108 for each camera are also listed in the box 1102.

As apparent, the information presented on the web site 1100 is arranged in a customized layout specifically designed to fit the ABC-Camera.com 1112. The embodiments discussed above facilitate the collection of the data regarding the cameras that are listed on the auction facility 700 and enable the arrangement of these data in a way most convenient for the web site 1100. The incorporation of the data form the auction facility 700 thus does not affect other applications unique to the web site 1100 of the ABC-Camera.com 1112.

Figure 11:
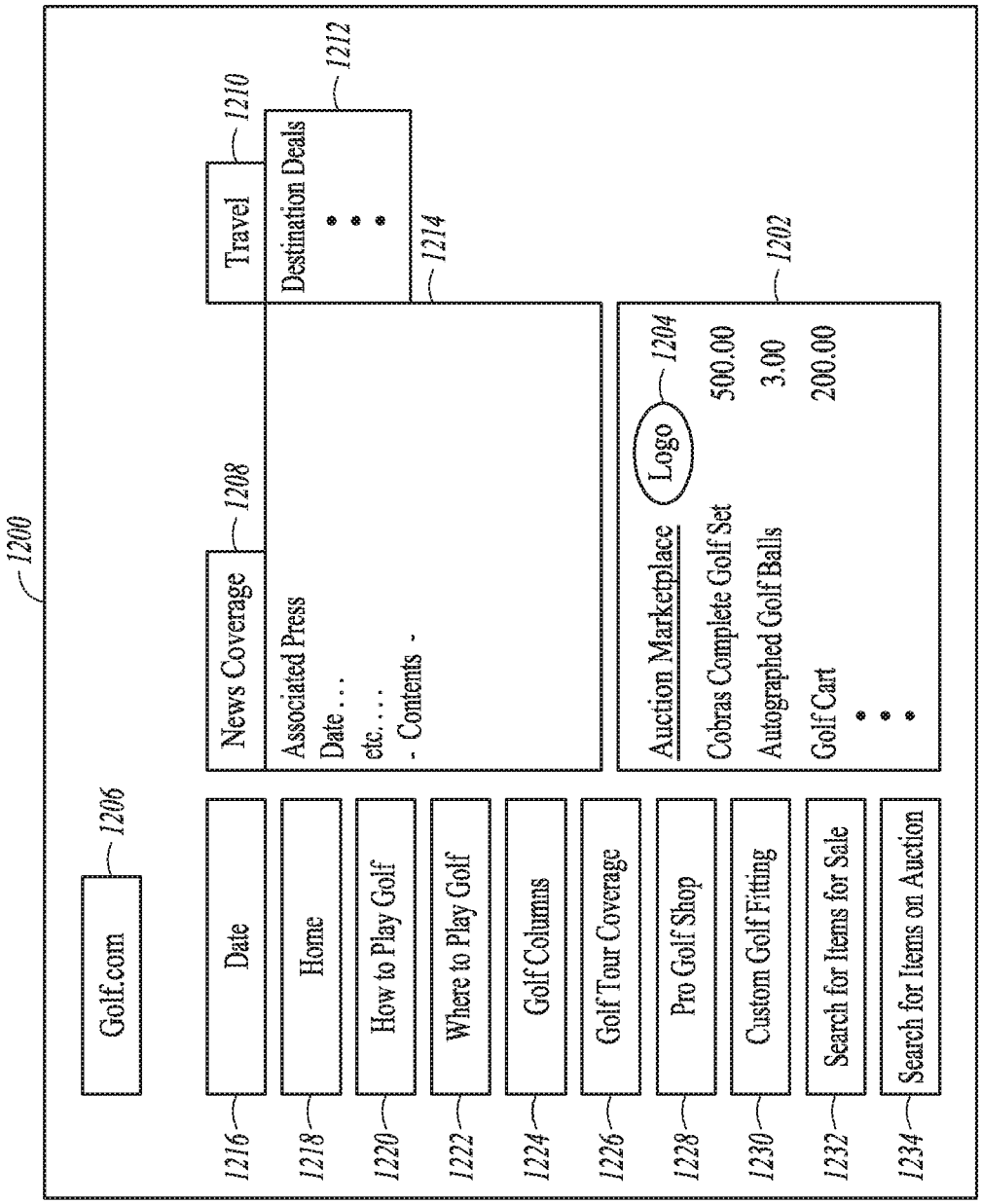

FIG. 11 illustrates yet another example that implements the third-party application embodiments discussed above. In this example, a Golf.com 1206 has a web site 1200 having a user interface that includes several applications that may be unique to the web site 1200. These applications may include a date information page 1216, a home page 1218, a how to play golf page 1220, a where to play golf page 1222, a golf columns page 1224, a golf tour coverage page 1226, a pro golf shop page 1228, a custom golf fitting page 1230, and a search page 1232. The web site 1200 also includes a news coverage section 1208, and a travel section 1210 including destination deals 1212 and the like.

Similar to the example illustrated in FIG. 10, the web site 1202 may wish to incorporate the data from the auction facility 700 into the web site 1202. Using the third-party application embodiment discussed above, the Golf.com 1206 can uniquely design how it wants the auction data to be presented to users of the Golf.com 1206. For instance, the Golf.com 1206 may wish to display only the name of the item and the price and perhaps, the logo of the auction facility 700 that the Golf.com 1206 obtained the data from.

Users of the third-party applications can interact directly with the live data of the network-based commerce facility while interacting with other unique applications at the same time. Furthermore, the present invention allows businesses, companies or developers to create custom functionality and interfaces for managing trading, auctions, users, and item lists that best meet these parties' business needs.

The parties that create the third-party applications no longer need to parse the pages of the network-based commerce facility that change frequently breaking their own applications. These parties thus can extend the reach of the network-based commerce facility to trading on new platforms and technology, such as handheld devices, web-enabled cellular phones, pagers, and more.

Computer Architecture

Figure 12:
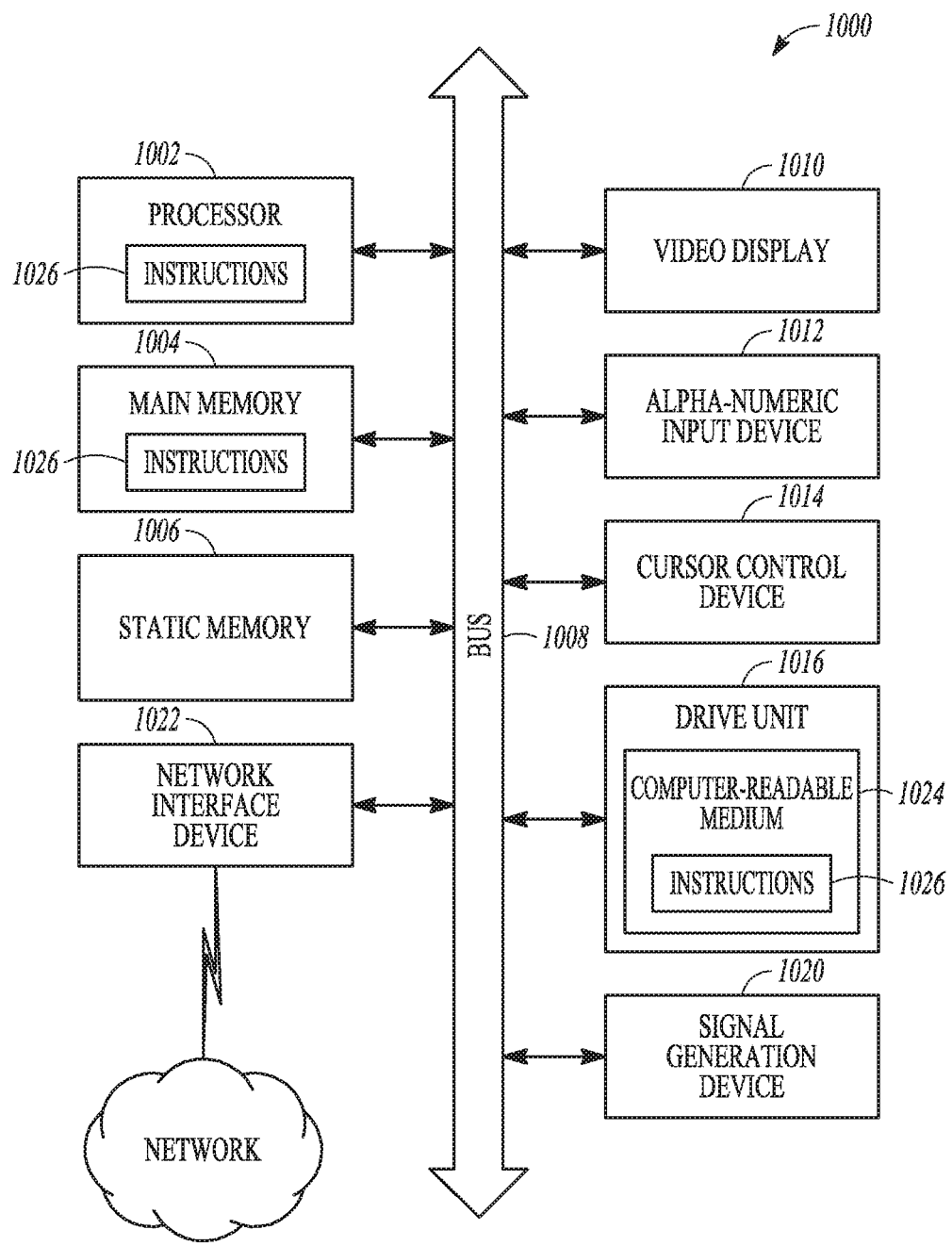
FIG. 12 illustrates a block diagram of an exemplary embodiment of a computer system that can implement exemplary embodiments of the present invention.

FIG. 12 shows a diagrammatic representation of machine in the exemplary form of a computer system 1000 within which a set of instructions, for causing the machine to perform any one of the methodologies discussed above, may be executed. In the alternative embodiment, the machine may comprise a network router, a network switch, a network bridge, Personal Digital Assistant (PDA), a cellular telephone, a web appliance or any machine capable of executing a sequence of instructions that specify actions to be taken by the machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for detecting suspicious transactions occurring over a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving, at a server, a request from a third-party application via a programmatic access application, the third-party application operating at a host computer, the request being based on communication between at least one of a first plurality of client devices and the third-party application, the request identifying a call function that performs, at least in part, an indirect transaction between the server and the at least one of the first plurality of client devices via the respective third-party application, wherein each call function specifies an allowable amount of information to be transferred from the server, the request further comprising a session certificate that uniquely identifies the associated third-party application, wherein the communication between the server and the third-party application uses a first data format;
   determining, by the server, whether the associated third-party application is authorized to use the function call based on the session certificate;
   performing, by the server, one or more actions corresponding to the call function in response to the request and the determining that the third-party is authorized to use the function call;
   communicating, via the programmatic access application, one or more results of the one or more actions to the respective third-party application in the first data format based on the specified allowable amount of information; and
   communicating, using a second data format, via the programmatic access application, with at least one of a second plurality of client devices, the second data format causing a direct transaction between the server and the at least one of the second plurality of client devices.

2. The method of claim 1, wherein the one or more actions include any one of registering as a user, selling, trading, buying, obtaining information, submitting information, updating submitted information, and accessing a user profile on the server.

3. The method of claim 1, wherein the one or more actions include auction transactions occurring on the server.

4. The method of claim 1, wherein the one or more actions include one or more of:
   listing an item for sale;
   re-listing an item for sale;
   changing an item attribute of an item for sale;
   checking for errors in a listing of an item for sale;
   listing auction fees for an item;
   obtaining information about an item;
   obtaining a listing of items listed in a particular category;
   searching for items;
   listing all items a particular user is selling;
   listing all items a particular user has bid on;
   obtaining a list of high bidders for an auction;
   obtaining information about a user;
   obtaining the feedback scores for a user;
   registering feedback about a user;
   obtaining a URL associated with a logo of the network-based commerce facility;
   obtaining an official time of the network-based commerce facility;
   activating a test user;
   retrieving custom categories;
   retrieving account information of a user; and
   adding text to a description field for an item.

5. The method of claim 1, wherein the call function interacts with a database of the server.

6. The method of claim 1, wherein the one or more results include information to be interpreted by an interpreter and to be arranged into a customized user interface that provides specialized operations designed for specific business needs.

7. The method of claim 1, wherein the session certificate indicates that the associated third-party application is authorized to use the call function.

8. The method of claim 1, wherein an eXtensible Markup Language (XML) parser parses the one or more results, at least one of the results being an XML document.

9. The method of claim 1, wherein the one or more results are transmitted from the server to the respective third-party application in the first data format, wherein the first data format comprises an XML format, wherein the second data format comprises an HTML format, the first data format being configured to operate with less data than the second data format.

10. The method of claim 1, wherein the first data format is an XML specification having customized tags.

11. A server comprising:
    a processor; and
    a memory to store instructions that, when executed by the processor cause the processor to perform operations comprising:
    receiving, from a host computer, a request from a third-party application via a programmatic access application, the third-party application operating at the host computer, the request being based on communication between at least one of a first plurality of client devices and the third-party application, the request identifying a call function that performs, at least in part, an indirect transaction between the server and the at least one of the first plurality of client devices via the respective third-party application, wherein each call function specifies an allowable amount of information to be transferred from the server, the request further comprising a session certificate that uniquely identifies the associated third-party application, wherein the communication between the at least one of the first plurality of client devices and the respective third-party application uses a first data format;
    determining, by the server, whether the associated third-party application is authorized to use the function call based on the session certificate;

performing, by the server, one or more actions corresponding to the call function in response to the request and the determining that the third-party is authorized to use the function call;

communicating, via the programmatic access application, one or more results of the one or more actions to the respective third-party application in the first data format based on the specified allowable amount of information; and communicating, using a second data format, via the programmatic access application, with at least one of a second plurality of client devices, the second data format causing a direct transaction between the server and the at least one of the second plurality of client devices.

12. The apparatus of claim 11, wherein the one or more actions include any one of registering as a user, selling, trading, buying, obtaining information, submitting information, updating submitted information, and accessing a user profile on the server.

13. The apparatus of claim 11, wherein the one or more actions include auction transactions occurring on the server.

14. The apparatus of claim 11, wherein the call function interacts with a database of the server.

15. The apparatus of claim 11, wherein the one or more results include information to be interpreted by an interpreter and to be arranged into a customized user interface that provides specialized operations designed for specific business needs.

16. The apparatus of claim 11, wherein the session certificate indicates that the associated third-party application is authorized to use the call function.

17. The apparatus of claim 11, wherein an extensible Markup Language (XML) parser parses the one or more results, at least one of the results being an XML document.

18. The apparatus of claim 11, wherein the one or more results are transmitted from the server to the respective third-party application in the first data format, wherein the first data format comprises an XML format, wherein the second data format comprises an HTML format, the first data format being configured to operate with less data than the second data format.

19. The apparatus of claim 11, wherein the first data format is an XML specification having customized tags.

20. A computer readable non-transitory medium comprising instructions, which when executed on a processor, cause the processor to facilitate programmatic access to a server via a network, the instructions performing a method comprising:

receiving, at the server, a request from a third-party application via a programmatic access application, the third-party application operating at a host computer, the request being based on communication between at least one of a first plurality of client devices and the third-party application, the request identifying a call function that performs, at least in part, an indirect transaction between the server and the at least one of the first plurality of client devices via the respective third-party application, wherein each call function specifies an allowable amount of information to be transferred from the server, the request further comprising a session certificate that uniquely identifies the associated third-party application, wherein the communication between the at least one of the first plurality of client devices and the respective third-party application uses a first data format;

determining, by the server, whether the associated third-party application is authorized to use the function call based on the session certificate;

performing, by the server, one or more actions corresponding to the call function in response to the request and the determining that the third-party is authorized to use the function call;

communicating, via the programmatic access application, one or more results of the one or more actions to the respective third-party application in the first data format based on the specified allowable amount of information; and communicating, using a second data format, via the programmatic access application, with at least one of a second plurality of client devices, the second data format causing a direct transaction between the server and the at least one of the second plurality of client devices.

* * * * *